(12) United States Patent
Streuber et al.

(10) Patent No.: US 10,818,062 B2
(45) Date of Patent: Oct. 27, 2020

(54) CROWDSHAPING REALISTIC 3D AVATARS WITH WORDS

(71) Applicants: MAX-PLANCK-GESELLSCHAFT ZUR FÖRDERUNG D. WISSENSCHAFTEN E.V., Munich (DE); THE BOARD OF REGENTS, THE UNIVERSITY OF TEXAS AT DALLAS, Austin, TX (US)

(72) Inventors: Stephan Streuber, Tübingen (DE); Maria Alejandra Quirós Ramírez, Tübingen (DE); Michael Black, Tübingen (DE); Silvia Zuffi, Bologna (IT); Alice O'Toole, Dallas, TX (US); Matthew Q. Hill, Dallas, TX (US); Carina A. Hahn, Dallas, TX (US)

(73) Assignees: MAX-PLANCK-GESELLSCHAFT ZUR FÖRDERUNG D. WISSENSCHAFTEN E.V., Munich (DE); Board of Regents, The University of Texas System, Dallas, TX (US)

( * ) Notice: Subject to any disclaimer, the term of this patent is extended or adjusted under 35 U.S.C. 154(b) by 0 days.

(21) Appl. No.: 16/047,221

(22) Filed: Jul. 27, 2018

(65) Prior Publication Data
US 2019/0108667 A1   Apr. 11, 2019

Related U.S. Application Data

(63) Continuation of application No. PCT/EP2017/051954, filed on Jan. 30, 2017.

(60) Provisional application No. 62/310,038, filed on Mar. 18, 2016, provisional application No. 62/288,478, filed on Jan. 29, 2016.

(30) Foreign Application Priority Data

Jan. 29, 2016  (EP) ...................................... 16153445
Mar. 18, 2016  (EP) ...................................... 16161178

(51) Int. Cl.
*G06T 13/40*     (2011.01)
*G06T 15/00*     (2011.01)

(52) U.S. Cl.
CPC ............ *G06T 13/40* (2013.01); *G06T 15/005* (2013.01); *G06T 2200/04* (2013.01); *G06T 2200/08* (2013.01); *G06T 2200/24* (2013.01)

(58) Field of Classification Search
CPC .......... G06K 9/72; G06K 9/723; G06K 9/726; G06T 19/00; G06T 17/20; G06T 17/00; G06T 15/10; G06T 15/00; G06T 17/10; G06T 17/005
See application file for complete search history.

(56) References Cited

U.S. PATENT DOCUMENTS 8,666,914 B1 *  3/2014  Dupin ................. G06F 16/3346
                                                706/12
2006/0122999 A1 *  6/2006  Sosnov ............... G06F 16/5854
(Continued)

*Primary Examiner* — Todd Buttram
(74) *Attorney, Agent, or Firm* — Siritzky Law, PLLC

(57) ABSTRACT

A method for generating a body shape, comprising: receiving one or more linguistic descriptors related to the body shape; retrieving an association between the one or more linguistic descriptors and a body shape; and generating the body shape, based on the association.

16 Claims, 20 Drawing Sheets

„feminine"   „long legs"   „pear shaped"   „rectangular"   „round apple"   „short"

(56) References Cited

U.S. PATENT DOCUMENTS

| | | | |
|---|---|---|---|
| 2009/0175545 A1* | 7/2009 | Cancedda | G06K 9/627 |
| | | | 382/229 |
| 2013/0249908 A1* | 9/2013 | Black | G06T 17/00 |
| | | | 345/420 |
| 2014/0078144 A1* | 3/2014 | Berriman | A63F 13/10 |
| | | | 345/426 |
| 2015/0070351 A1* | 3/2015 | Tarquini | G06T 13/40 |
| | | | 345/419 |
| 2017/0132498 A1* | 5/2017 | Cohen | G06F 17/2785 |

* cited by examiner

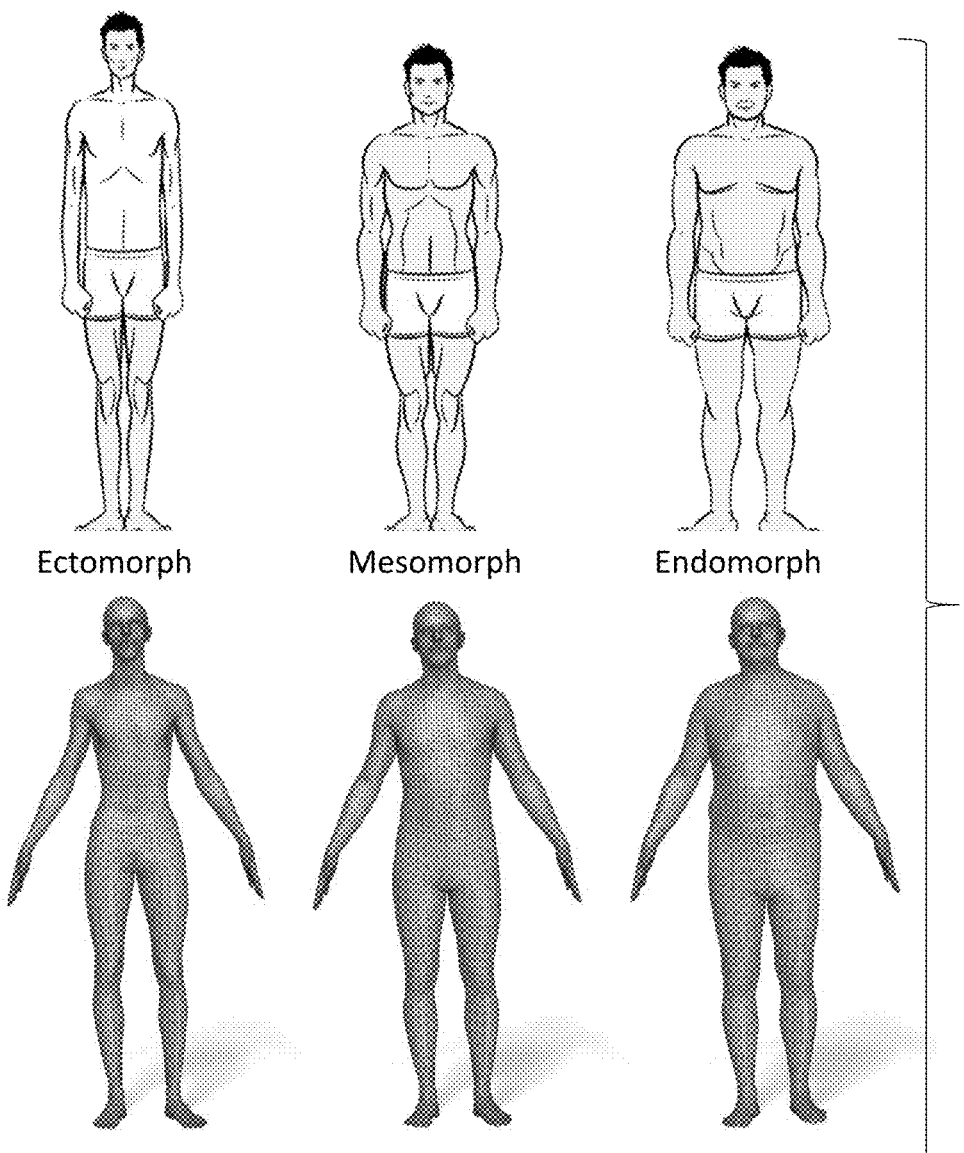
Figure 11
Figure 12
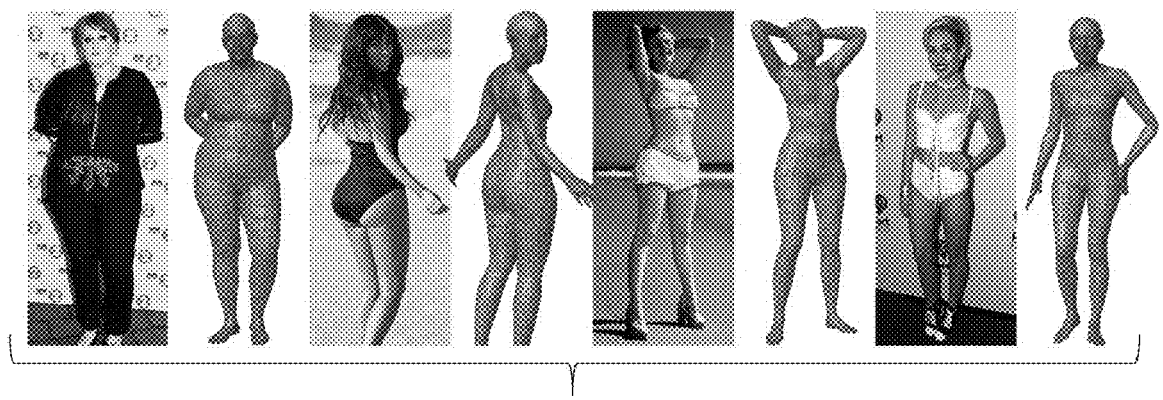

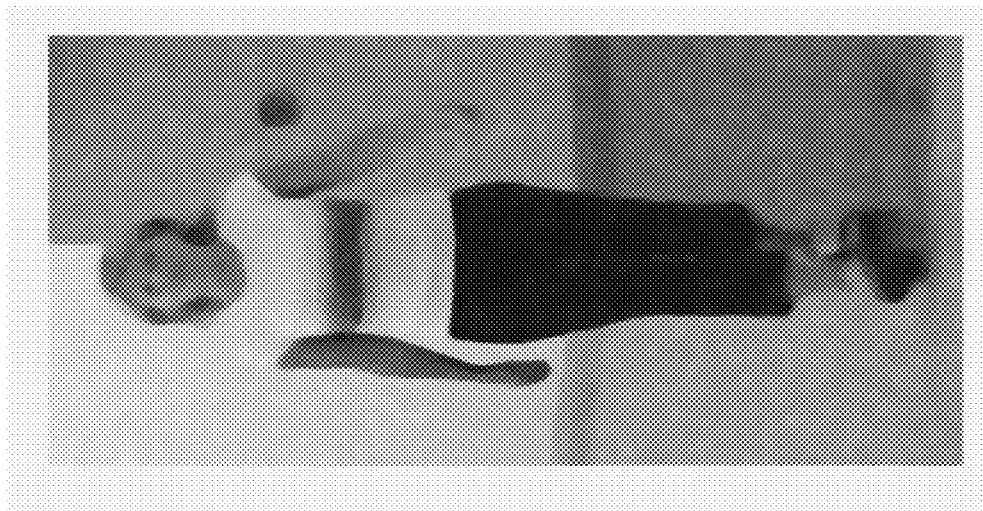
FIG. 15A
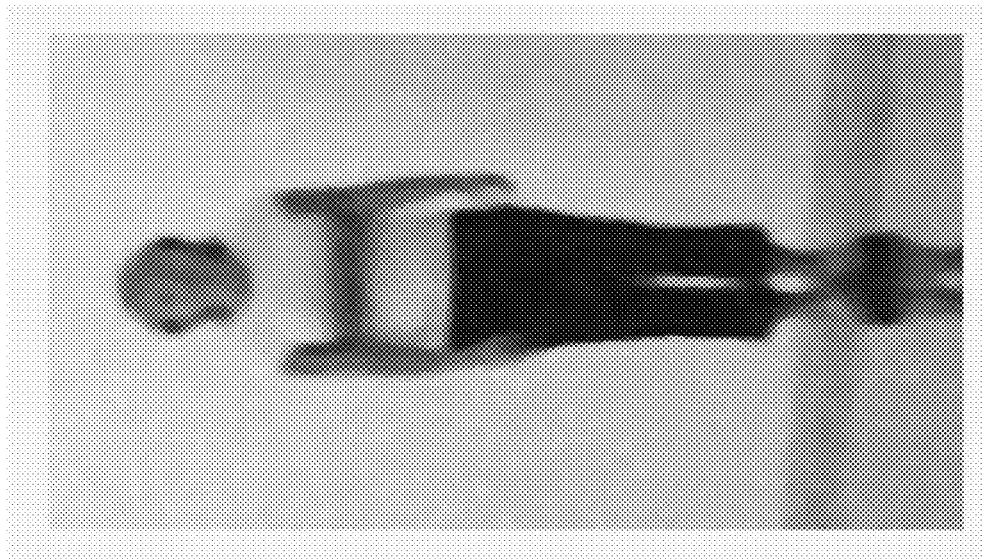

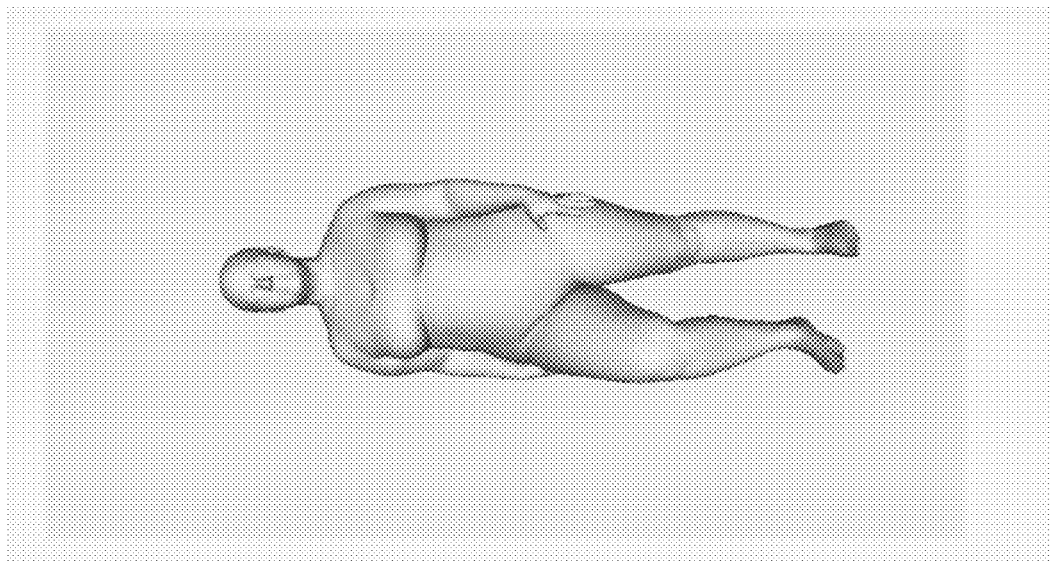
FIG. 15B
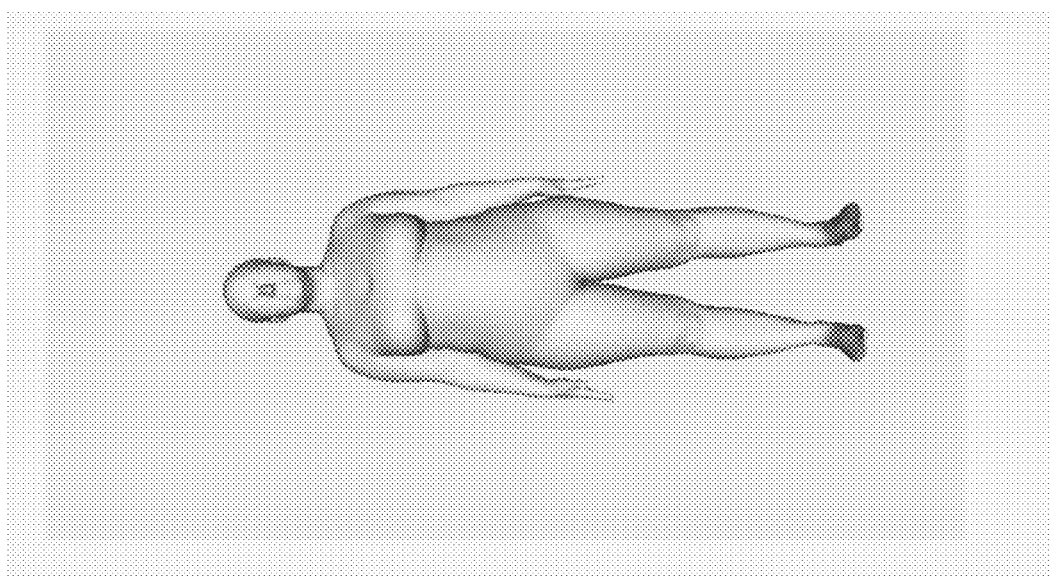

Figure 17A
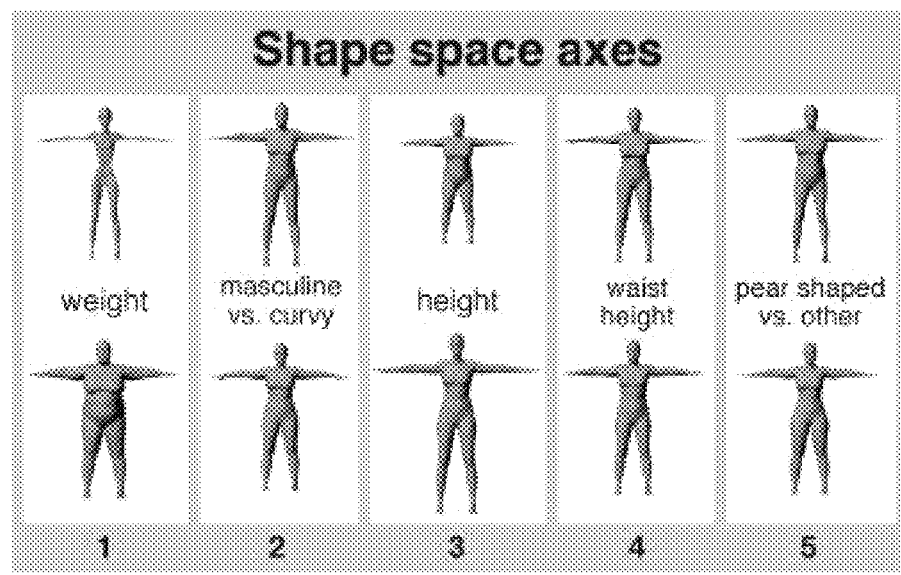
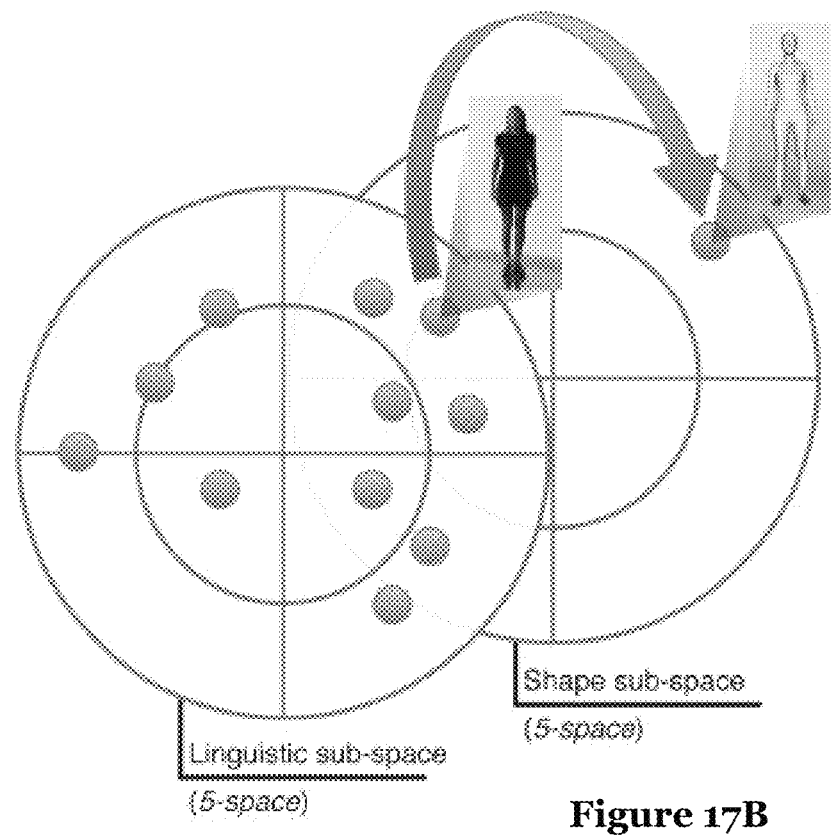
Figure 17B

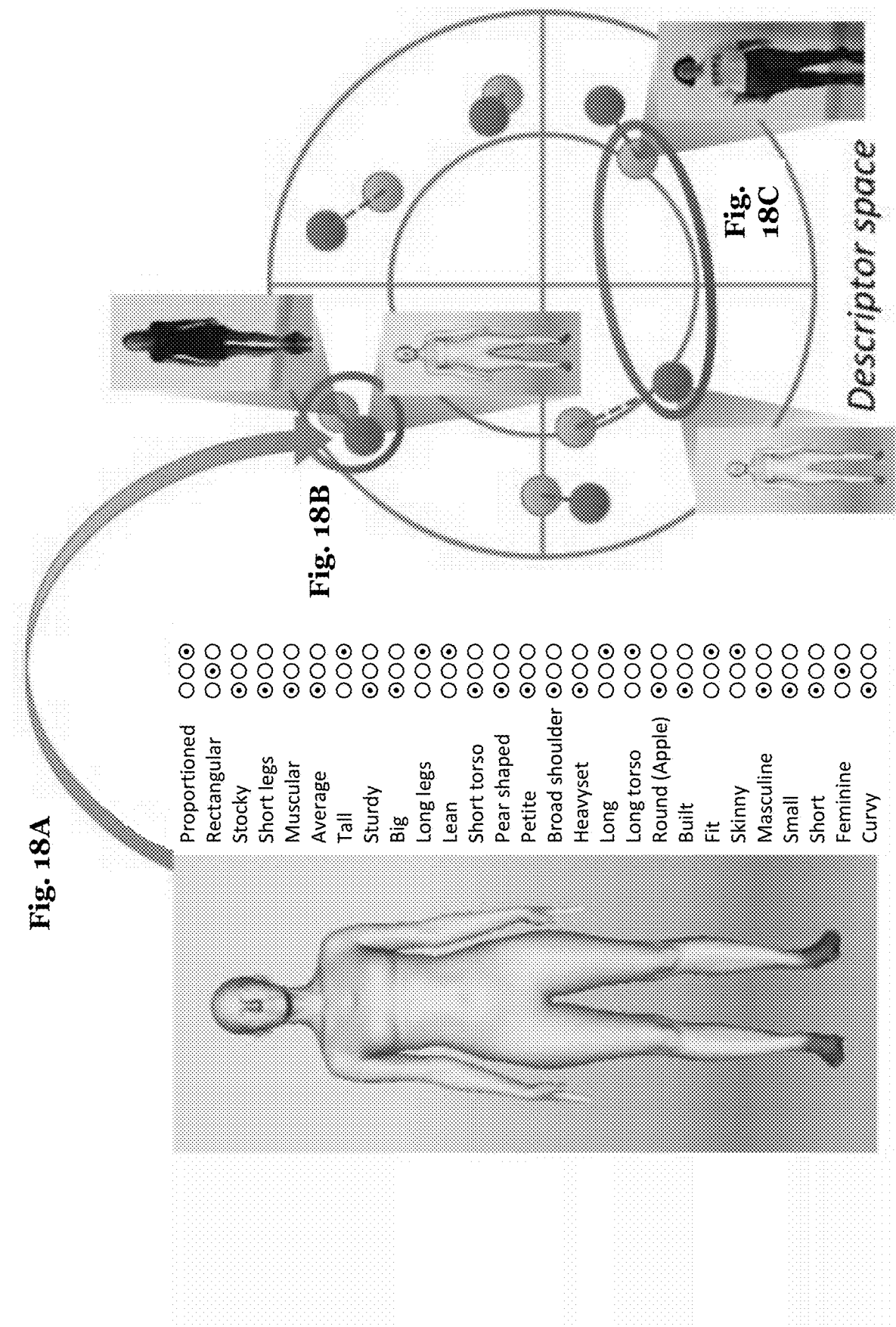

CROWDSHAPING REALISTIC 3D AVATARS WITH WORDS

CROSS-REFERENCE TO RELATED APPLICATIONS

This application is a continuation of application number PCT/EP2017/051954, filed Jan. 30, 2017, titled "Crowdshaping Realistic 3D Avatars with Words," the entire contents of which are hereby fully incorporated herein by reference in its entirety for all purposes. Application PCT/EP2017/051954 claims priority from: (1) European Application EP 16 153 445.8, filed Jan. 29, 2016; (2) U.S. Application No. 62/288,478, filed Jan. 29, 2016; (3) European Application EP 16 161 178.5, filed Mar. 18, 2016; and (4) U.S. Application No. 62/310,038, filed Mar. 18, 2016, the entire contents of each of which are hereby fully incorporated herein by reference in their entirety for all purposes.

INTRODUCTION

Bodies and their shape are important for communication, recognition of identity, and conveying emotion. Shape further is an indicator of gender, age, health, and fitness. Arguably, the human body is the object with which we are most familiar and, not surprisingly, our language for communicating body shape is rich. These properties make human bodies a good test case for modeling the relationship between language and shape.

The demand for realistic 3D digital avatars is therefore expanding with applications in games, virtual reality, on-line shopping, and special effects. Realistic 3D bodies can be created from high-end scanners, low-cost range cameras, and tailoring measurements. High-end scanners (laser, structured light, stereo) produce realistic avatars, but are costly and not widely available. There are many methods that extract avatars from range cameras, typically with lower quality, but even these sensors are not yet widely available. Traditional tailoring measurements can be taken by anyone with a tape measure and have been used to create avatars but the approach is error prone. Naive subjects exhibit significant variance in measurements as do even experienced anthropometrists, using a well-defined protocol. For the wide use of realistic 3D avatars in shopping, games, fitness, etc., a simple, easy to use, low-technology, and fun body creation solution is required.

It is therefore an object of the invention to propose a novel method for estimating perceptually and metrically accurate 3D geometry of human bodies in an intuitive and technologically inexpensive way.

This object is achieved by the method and the device according to the independent claims. Advantageous embodiments are defined in the dependent claims.

In a first aspect, the invention provides a model for associating linguistic terms and body shapes, i.e. their digital representations. A computer-implemented method for generating a body shape according to the invention may comprise the steps of receiving one or more linguistic descriptors related to the body shape; retrieving an association between the one or more linguistic descriptors and a body shape; generating the body shape, based on the association; and outputting the generated body shape.

The association may be learned from a set of training examples. The training examples may comprise descriptions of body shapes by humans. The training examples may be generated randomly. The association learned from the training set may be linear. In particular, it may have been learned using principal component analysis (PCA).

The training set may comprise photos of persons. The body shape may be retrieved from a database. A set of similar body shapes may be generated. The linguistic descriptors may include words not related to body shape.

In a further aspect, the method and device according to the invention may be used for visualizing word meaning. A slider may be used to set linguistic body descriptors.

BRIEF DESCRIPTION OF THE DRAWINGS

These and further aspects of the present invention will become further apparent from the following description of two detailed embodiments of the invention, in connection with the attached drawing, in which:

FIG. 11: shows somatotypes. (top) Typical artist depiction of the body types: mesomorph, ectomorph, and endomorph. (Source: Wikipedia, Artist: Granito diaz, Creative Commons Attribution-Share Alike 4.0 International license). (bottom) Crowdshaping results from Body Talk.

FIG. 12: shows celebrity bodies. Crowdshaping a few famous bodies using photos from the Internet.

FIGS. 15A-15B: Example rating screen: for photographed bodies (FIG. 15A) and for 3D model bodies (FIG. 15B). Photographed bodies were shown with a "sponge" filter applied. For each body, participants viewed one standing image and one mid-stride image simultaneously. The descriptor terms and response radio buttons appeared in the center of the screen.

(FIG. 16A) Axes 1 and 2 (FIG. 16B) Axes 3 and 4. (FIG. 16C) The highest contributing descriptors for the first 5 axes. Negative projection scores (left) and positive scores (right). Descriptor words with the highest contribution scores appear in black; gradations of gray indicate terms with lessor contribution scores. (FIG. 16D) Lists the semantic interpretations of the first 5 axes, which are based on descriptors with high contribution scores that projected to opposite ends of the axes.

FIGS. 17A-17C: shows shape space bodies and the relationship to photographed bodies. (FIG. 17A) The first 5 principal components of the shape space. Bodies are rendered on opposite sides of each axis (+3 or −3 standard deviations from the origin). Tentative labels are applied from the interpretations of the language space axes. (FIG. 17B) Schematic of process whereby 3D body models of people in photographs were generated using the coordinates of the photograph description in the five dimensional subspace of the language space-after aligning the two spaces based on analogously interpreted axes. (FIG. 17C) Example pairs of photographed bodies and their corresponding approximated 3D bodies.

FIGS. 18A-18C: are a schematic illustration of the method for measuring resemblance in the language space between photographed bodies (blue circles) and 3D bodies (red circles). Dotted purple lines indicate true-match pairs. (FIG. 18A) A 3D body is projected as a point into the language space using its description vector. (FIG. 18B) An example of a true match pair in the language space that shows the distance between the projected point (made from the 3D body's description) and its corresponding photographed body. (FIG. 18C) An example of a non-matched pair that shows the distance between descriptions of a photographed body and an unrelated 3D body model.

DETAILED DESCRIPTION

Figure 1:
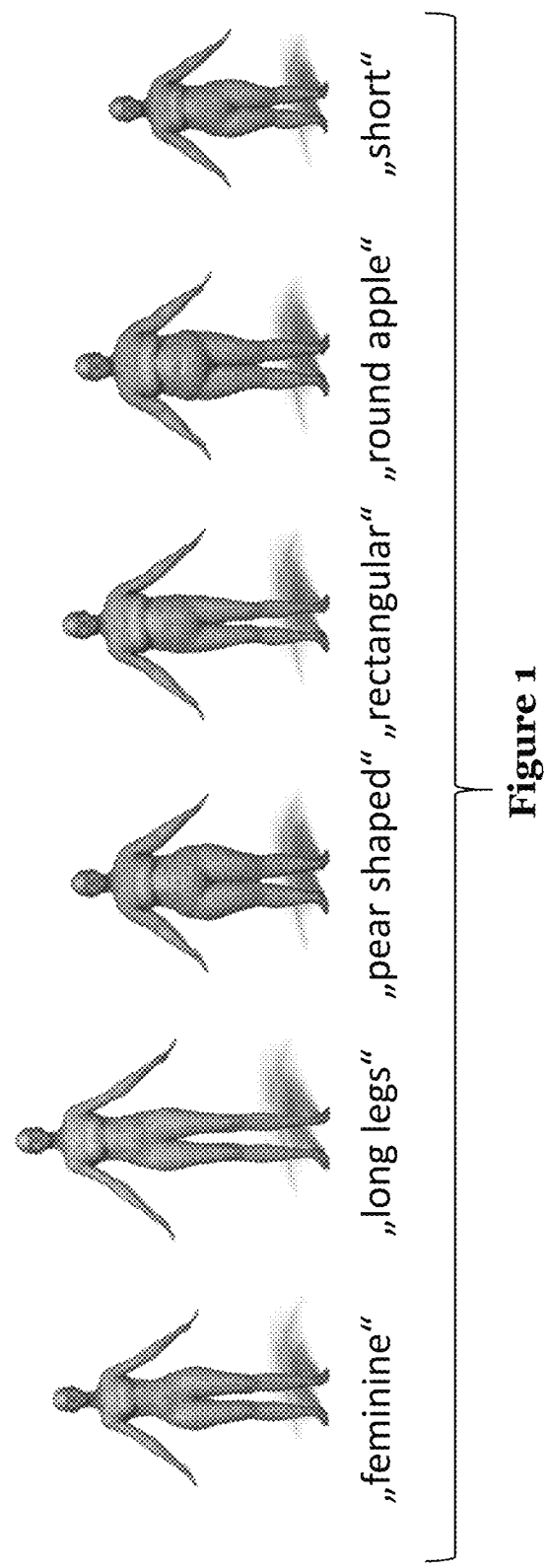
FIG. 1: shows prototypical body shapes. Random 3D body shapes are generated, rendered as images, and then ratings of the images are crowd sourced using words that describe shape. A model of how 3D shape and linguistic descriptions of shape are related is learned. Shown are the most likely bodies shapes, conditioned on the words below them exaggerated for clarity. The consistency of the "crowd" suggests that an understanding of the 3D meaning of these shape attributes is shared by observers.

According to a first embodiment of the invention, a mapping between a linguistic body space and a geometric body space is established on an empirical basis.

The geometric body space is provided by the identity component of SMPL [LOPER, M., MAHMOOD, N., ROMERO, J., PONS-MOLL, G., AND BLACK, M. J. 2015. SMPL: A skinned multi-person linear model. ACM Trans. Graphics (Proc. SIGGRAPH Asia) 34, 6 (October), 248:1-248:16; LOPER, M. M., MAHMOOD, N., ROMERO, J., PONS-MOLL, G., AND BLACK, M. J., 2015. A skinned multi-person linear model. US and PCT provisional patent application, number 62183853, June]. The body is represented by a 3D template mesh with 6890 vertices. The template mesh is registered to high-resolution body scans in the CAESAR dataset [ROBINETTE, K., BLACKWELL, S., DAANEN, H., BOEHMER, M., FLEMING, S., BRILL, T., HOEFERLIN, D., AND BURNSIDES, D. 2002. Civilian American and European Surface Anthropometry Resource (CAESAR) final report. Tech. Rep. AFRL-HEWP-TR-2002-0169, US Air Force Research Laboratory], resulting in 1700 registered meshes for males and 2100 for females. Variations in pose are removed to create a shape training dataset. Body shape is defined by a mean mesh and the deviations from this mean in the space of vertices, computed using PCA. The present embodiment uses first 8 principal shape components of SMPL. These account for 96:56% of the identity related body shape deformations in the shape training dataset.

While eight components captures significant variance in the human population, some bodies may fall outside this space. Some words may correspond to rare shapes that are only captured by principal components with lower eigenvalues. If desired, more components can be used.

The linguistic space is represented in terms of 30 body descriptor words (e.g. curvy, fit, heavyset, round-apple) shown in Table 1. Using Amazon Mechanical Turk (MTurk), ratings of bodies were collected, with respect to these words, from many raters.

TABLE 1

| Average | Big | Broad Shoulders | Built |
|---|---|---|---|
| Curvy | Feminine | Fit | Heavyset |
| Lean | Long Legs | Long Torso | Long |
| Masculine | Muscular | Pear Shaped | Petite |
| Proportioned | Rectangular | Round Apple | Short Legs |
| Short Torso | Short | Skinny | Small |
| Stocky | Sturdy | Tall | Attractive |
| Sexy | Hourglass | | |

Words may not fully capture the space of body shape and, if one does not have words to describe a shape, one will not be able to recover it (unless it is correlated with other shape properties or words). To address this, new words can be added as needed. It is straightforward to collect data with new words and include it in the model as long as the ratings are done on the same training set. Preferably, users are allowed to suggest new words to better describe shapes. Then, new words can be rated by more raters and included in the model.

Here, a basic set of 30 words is used, plus additional ones depending on the application. If one could use fewer and achieve the same accuracy this would make crowd sourcing faster and less expensive. In the present embodiment, greedy algorithm is proposed to optimize the word set to minimize metric error. The word that reduces the error in body shape the most is found. Given this word, the next best is found, and so on.

The identity component of SMPL is used to generate 128 synthetic female and 128 synthetic male bodies in a neutral pose by randomly sampling the first 8 principal shape directions. Training bodies may be sampled uniformly along each PC direction, or by taking bodies at fixed distances from the mean, or by sampling bodies from the CAESAR dataset. Preferably, bodies are sampled from a Gaussian distribution, using the variances given by PCA.

Alternatively, one could take the entire CAESAR dataset and have raters rate every body. To do so, the SMPL model is fit to the high-resolution meshes and then only the body created using the first few principal components is displayed. This removes extraneous details that are not relevant to overall shape judgement. Using CAESAR in this way has the advantage that these are real bodies and the dataset contains associated meta-data like measurements, age, etc. To keep the costs down, the sampled bodies may be used instead. These provide an efficient and effective way of exploring the space of body shapes.

The resulting 128 female and 128 male meshes represent synthetic bodies that capture the global features of expected body shape variation in the normal female and male population. The pose of the bodies is set to the mean pose of women and men in the CAESAR dataset respectively.

Figure 2:
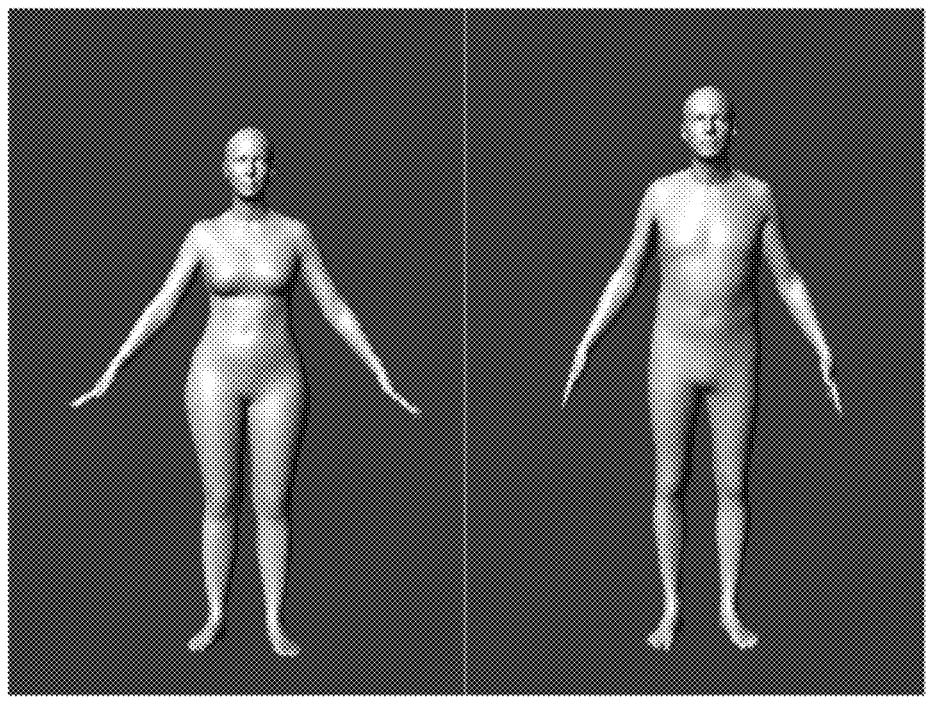
FIG. 2: shows training bodies. Example images of synthetic male and female bodies shown to raters.

FIG. 2 shows two example images of a random female and male body used as a stimulus in this embodiment. Each synthetic body may be rendered in Maya using the same camera model for all subjects. The viewing direction and lighting are the same for all stimuli, and bodies are only shown from the same frontal orientation. The feet are always in the same vertical location, meaning that the height of the person in the image conveyed relative information about the person's 3D height.

Here, training bodies are only shown in a frontal view. This prevents rating some aspects of shape. More views may be rendered and presented to raters with side and/or rear views (either together or separately).

Figure 3:
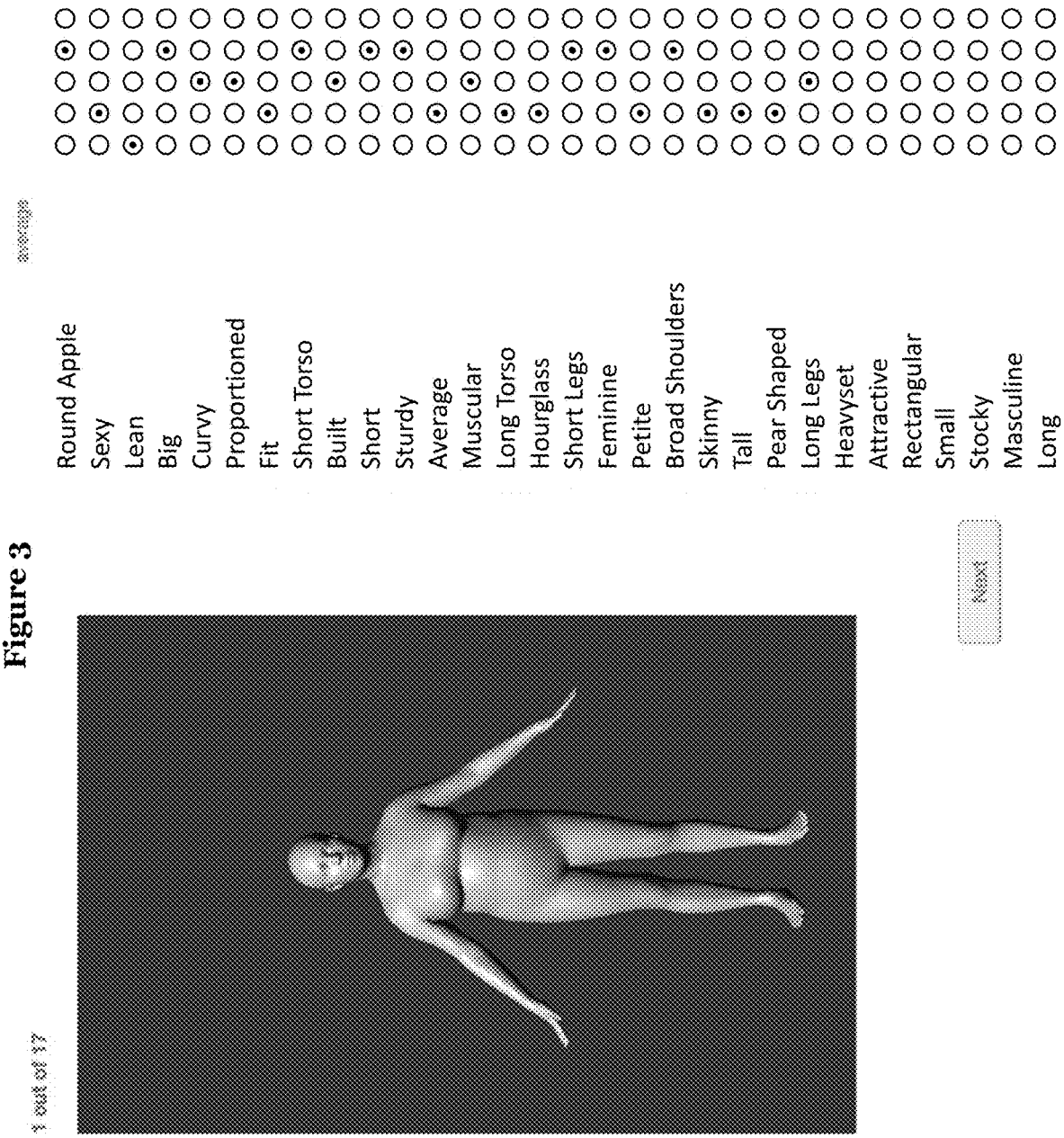
FIG. 3: shows an example of the task shown to MTurk raters.

In order to establish a relationship between the geometric shape space and a linguistic shape space, 265 MTurk users were asked to rate the male and female synthetic bodies using the 30 descriptive words. While showing a synthetic body on the screen, participants were asked to rate the body shape according to each word on a 5-point Likert scale: [(1) does not apply at all, (2) does not apply, (3) average, (4) does apply, (5) completely applies]. Each participant performed only one human intelligent task (HIT). Other scales could be used. Each HIT consisted of a qualification test, the rating of 15 synthetic bodies, and the rating of 2 extra bodies, which were used as catch trials. An example HIT is illustrated in FIG. 3.

The catch trials consisted of the presentation of an extremely "skinny" or "big" body. Participants who did not rate the catch trials correctly were excluded from the experiment (approx. 10% of the participants). In order to assure that participants understood the shape attribute words, a language qualification test war performed, which required participants to find the right synonyms for different adjectives. Only those participants who passed the qualification test were allowed to participate in the HIT. During the HIT, each rating task was displayed for at least 30 seconds, to make sure that the participants were not assigning ratings randomly without carefully considering the word descriptors. In order to test fluent English speakers, participants located in the US were chosen.

After each session demographic data was collected (e.g. gender, age, nationality). The final dataset consisted of approximately 15 ratings for every word descriptor for each of the 256 synthetic bodies. The dataset was split into the ratings for the 128 female and 128 male synthetic bodies.

Because the way a body is rated may be correlated with the rater's own body and gender, one may collect the body shapes of raters e.g. through photographs. The ratings can then be normalized or the predictions conditioned based on the body shapes of the raters.

Instead of eliciting comparative ratings, which have to be turned into metric distances, it was found to be easier for people to make scale judgements, but one could also use pairwise judgements to build the model.

For a single gender, let the shape of a body $i \in 1, \ldots, 128$ be a vector $y_i = [\beta_1, \ldots, \beta_8]^T$ where the $\beta$'s are the linear coefficients that represent body shape in the PCA space. Let the vector of ratings for each rater k and body i be a vector $[r_{1,i,k}, \ldots, r_{W,i,k}]^T$, where W=30 words. The individual ratings are noisy and it was found useful to average the ratings for a body over the raters, giving 128 rating vectors denoted $x_i = [\bar{r}_{1,i}, \ldots, \bar{r}_{30,i}]^T$. Median rating vectors were tested with similar results. A trimmed mean represents a good compromise between robustness and statistical efficiency. One can also train the model with the full set of ratings, without the averaging step.

The observation matrix is then $$X = \begin{bmatrix} 1 & x_1^T \\ \vdots & \vdots \\ 1 & x_{128}^T \end{bmatrix}$$

and the bodies are represented in $Y=[y_1, \ldots, y_{128}]^T$ with one body per row. Assuming a linear relationship between ratings and shape coefficients, the regression coefficients B in $$Y = XB + \in$$

May be found using least squares.

This defines the words-to-shape model (w2s) according to the present embodiment of the invention. Given a new rating vector x, one multiplies by B to get the body shape coefficients y and these define the shape in the SMPL PCA space.

Conditioning on Ratings.

Different shape descriptors like "skinny" and "petite" are correlated. The term $X^T X$ represents these correlations in the ratings of different words. This defines a multi-variate Gaussian distribution over the word ratings. This is useful because one may then condition on one or more shape attributes setting them to a constant and generate the most likely ratings of the other words. This is how the bodies in FIG. 1 were generated. One word is set to a high value, and conditioned on this, the most likely values for the other words are generated. Then, the w2s model may be used to generate the body shape for the predicted rating.

Additional Cues.

As shown below, the w2s model is able to recover surprisingly accurate 3D body shapes. For many applications, more data is available to achieve higher accuracy. Specifically, most people roughly know their height and weight. Hence, height, weight, or both can be included in the rating vector as $x_i = [h_i, w_i, \bar{r}_{1,i}, \ldots, \bar{r}_{30,i}]^T$, where $h_i$ and $w_i$ represent the (possibly wrong) height and weight of subject i. The rating vectors are augmented in this way and two additional models are trained: "words and height" (wh2s) and "words, height and weight" (whw2s). Other cues such as age may be added.

Shape to Words.

In addition to mapping from words to shape, it is useful for several applications to do the opposite. To do so, one may simply invert the linear regression in Eq. 2 of the w2s model to create a shape-to-words (s2w) model. Then given the 8 shape parameters of any body, one may predict a vector of word ratings.

To evaluate metric accuracy, the training meshes were used in a leave one-out cross-validation approach. In addition to the ratings of each body (described above), one needs the equivalent of "self-reported" height and weight to test the wh2s and whw2s models. To that end, the ground truth height is extracted from the test meshes by taking the difference between the maximum and minimum vertex position in the vertical axis of the mesh. The weight of the training bodies is calculated by computing their volume and applying a standard approximation of body density. In the linear regression, the cube root of weight is used preferably, as it is more linearly related to other measurements.

It is well known that people have systematic bias in self-reporting height and weight. For example, one study found that men and women overestimated height by 1.23 (2.57) cm and 0.60 (2.68) cm respectively (standard deviation in parentheses). Men and women also underestimated their weight by 1.85 (2.92) kg and 1.40 (2.45) kg respectively, with heavier people underestimating by more. With self-reported measurements one can use these data to correct for the bias. For the test data, it is assumed that the bias has been corrected and zero-mean Gaussian noise using the standard deviations above is added to simulate human self-reporting error.

The w2s-model was evaluated in terms of metric (geometric), measurement (anthropometric), and perceptual accuracy.

Metric analysis is performed on the training data using leave-one out cross validation. For each gender, the w2s model is trained 128 times, leaving out one body and its ratings each time. The ratings for the held-out bodies are used to predict the w2s body shape vector, giving 256 predicted body shape vectors, each representing one of the synthetic bodies. Using SMPL the body meshes are reconstructed using each predicted body shape vector. Then, the original synthetic bodies are compared with the predicted bodies to quantify the prediction accuracy of the word-to-shape model.

Prediction accuracy is defined in terms of "reconstruction error" (RE), which is the mean absolute distance between each vertex in the original body mesh and the corresponding vertex in the mesh that was reconstructed from the words. The RE is calculated for each of the 128 female and 128 male bodies. The results reveal an RE of 10.595 mm (SD=8.233 mm) for female bodies and an RE of 11.011 mm (SD=8.457) for male bodies.

Figure 4:
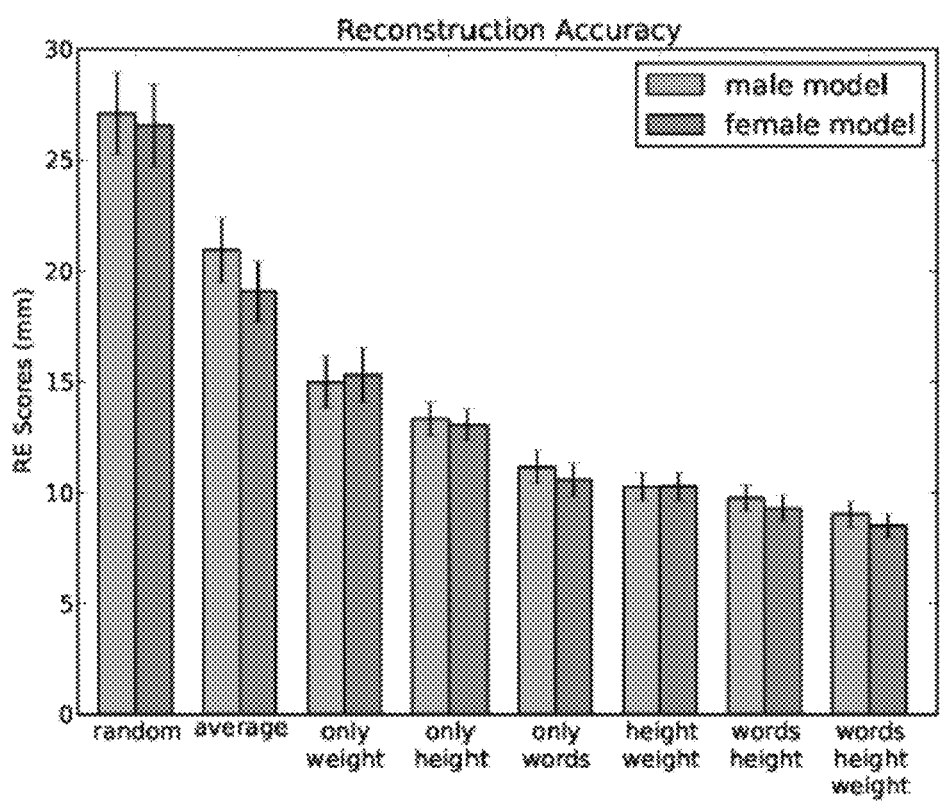
FIG. 4: shows a reconstruction error. Error in estimating synthetic female and male bodies using different methods of prediction: random, average, weight only, height only, words only, height+weight, words+height, words+height+weight. Whiskers correspond to the standard error (SE).

Linear models trained using various combinations of words, height and weight. Recall that height and weight were also tested. The results are summarized in FIG. 4. As a baseline, accuracy is reported using the average body as well as using body shapes randomly sampled from SMPL. Using only words does a reasonable job even though the words contain no explicit metric information. Height and weight alone give reasonable metric accuracy but combining them with words is even better. The words provide additional metric information.

The most accurate model is the whw2s model that uses words, height and weight. This gives an RE of 8.06 mm (SD=5.93) for female bodies and an RE of 9.05 mm (SD=6.42) for male bodies. For comparison, a commercial scanning solution using 10 Kinect frames has an error of 3.4 mm in a lab setting on different subjects.

To test the significance, dependent t-tests of the mean RE scores obtained from the cross validation procedure were conducted. The t-test revealed a significant difference between the mean RE score obtained from the w2s-model and the mean RE score obtained from using words, height and weight together, t=6:686; p<0:001. Further, there was a significant difference between the RE score obtained from the height and weight model and the RE scores obtained from the model with all three, t=5:545; p<0:001. The t-test between the RE scores obtained in the w2s model and the RE scores obtained using only height and weight was not significant, t=0:986; p=0:325.

Figure 5:
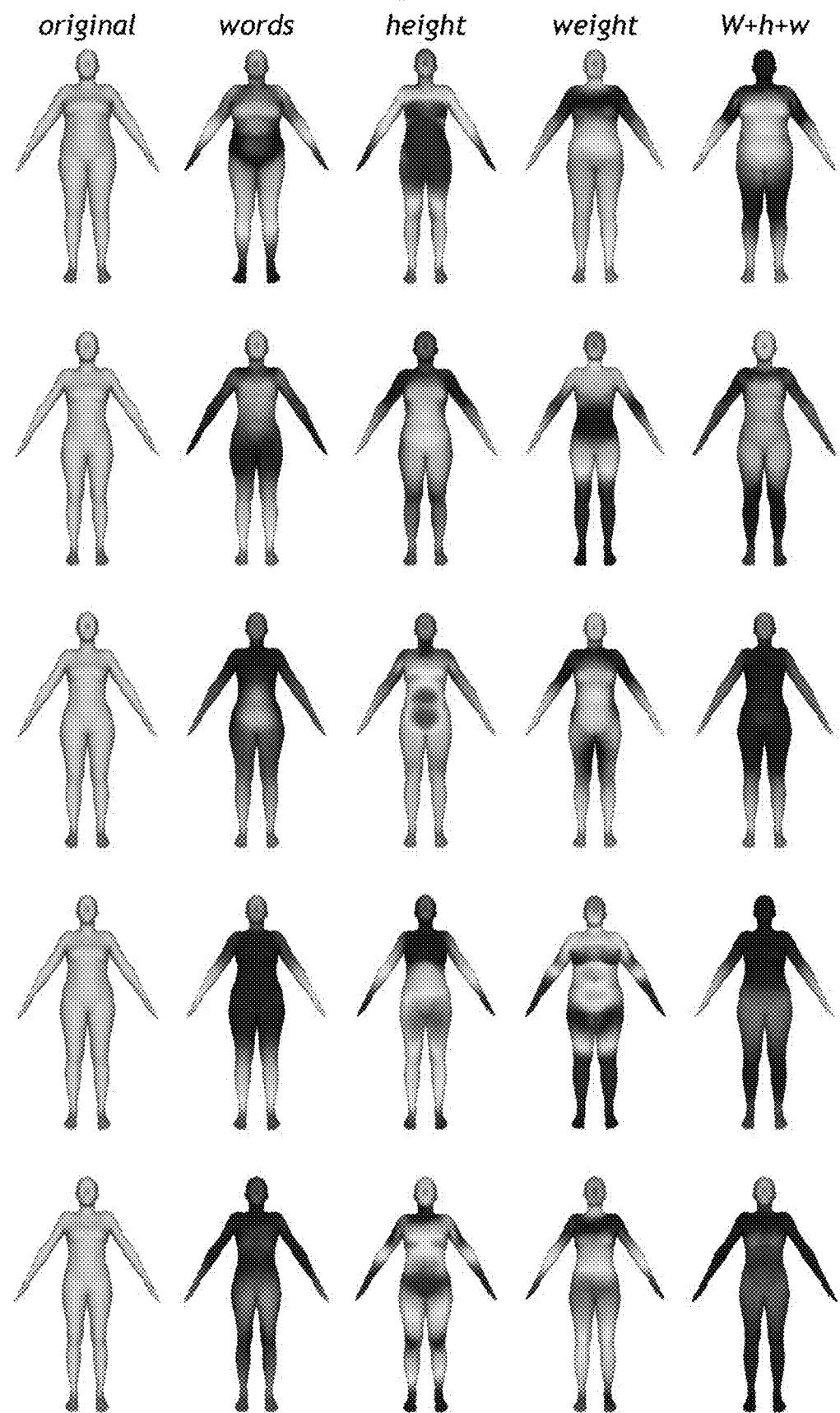
FIG. 5: illustrates words to shape estimation and shows a selection of original and reconstructed female body meshes. The first column shows the synthetic body shape used to collect word ratings (rendered differently here). The color scale indicates the reconstruction error (RE); Blue=0 mm and red>30 mm. Column 2 shows the predicted mesh from words only. The meshes in columns 3 and 4 were predicted from only height and weight respectively. Column 5 shows the meshes predicted by combining words, height, and weight.

FIG. 5 shows examples of reconstructions of female body meshes from word ratings (column 2, "words"). The errors in the prediction are mostly at the extremities and can be attributed primarily to errors in estimating the height of the body. The qualitative shape is similar to the true body. Bodies predicted from just height and weight fail to capture body shape while the model combining words, height and eight (whw2s) results in predictions that are both visually similar to the truth and metrically more accurate.

Given the similarity observed for RE in men and women (FIG. 4), in the remainder results are reported only for women, unless otherwise stated.

Figure 6:
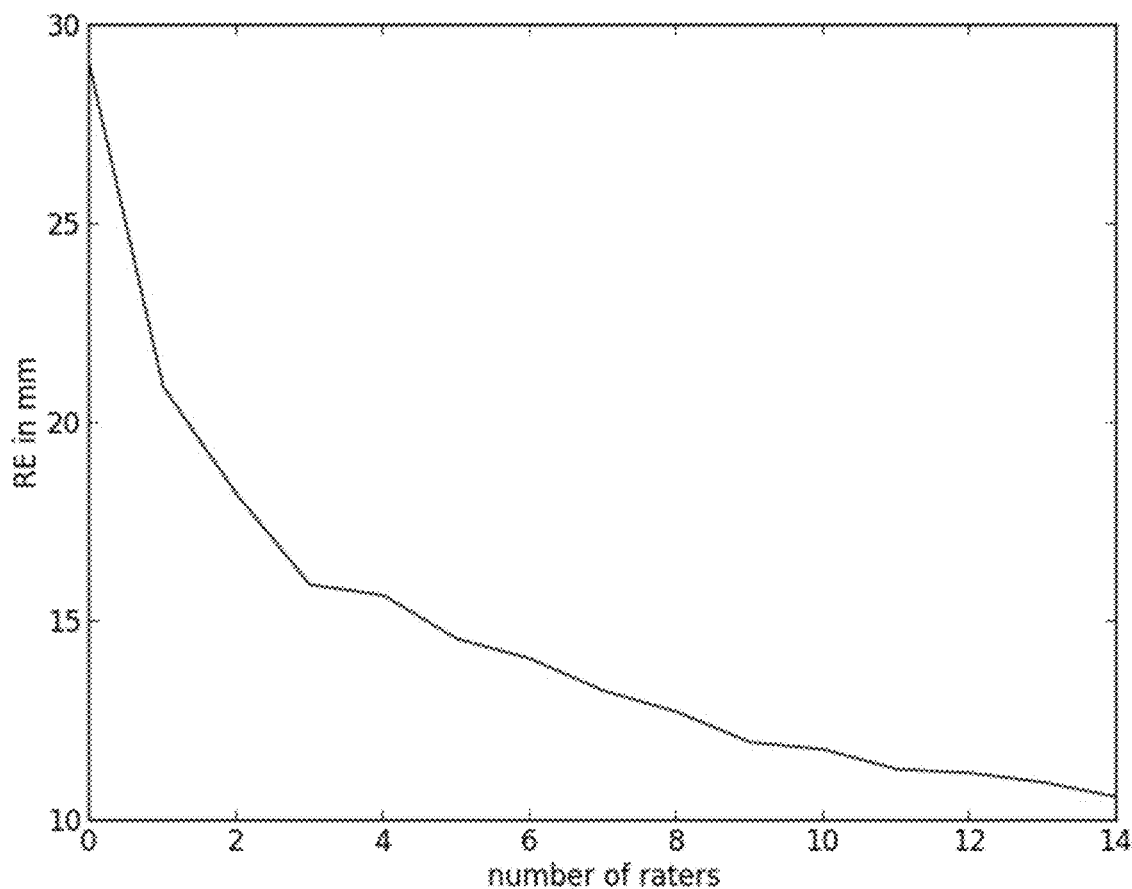
FIG. 6: shows a reconstruction error (RE) in millimeters versus the number of ratings per image.

For all experiments, 15 ratings are used per word and per body. FIG. 6 shows the effect of the number of ratings on accuracy; this uses all 30 words. Using only one rater does not produce metrically accurate results. It is the "wisdom of the crowd" that enables the accuracy. From the plot it appears that even more ratings could further reduce the error.

For applications like clothing sizing, it may be important how does vertex error relates to more intuitive measurements like lengths and girths. To answer this, anthropometric measurements are extracted from the reconstructed meshes by calculating distances between joint locations (e.g. upper arm length was calculated as the distance between the shoulder joint and the elbow joint) or by calculating circumferences around specific body parts such as hips, waist, or neck. Using the same data and cross validation as above, the average absolute errors between the anthropomorphic measurements of the predicted bodies and those of the true bodies may be computed.

TABLE 2

Anthropomorphic measurement errors (women). Mean absolute errors and standard deviations for several body measurements: linear error in mm, weight in kg. A model using only words is already quite accurate. Errors go down when self-reported height and weight are used (here with simulated noise). AE refers to the "allowable error" (see text).

| Measurement | w2s | | whw2s | | AE |
| --- | --- | --- | --- | --- | --- |
| | error | SD | error | SD | |
| height | 26.21 | 20.80 | 15.51 | 11.6 | 10 |
| weight | 4.21 | 3.19 | 1.87 | 1.42 | |
| lower leg length | 7.94 | 6.16 | 6.28 | 4.89 | 6 |
| upper leg length | 7.01 | 5.33 | 5.64 | 4.34 | 6 |
| upper arm length | 5.09 | 4.19 | 4.07 | 3.51 | 6 |
| lower arm length | 5.49 | 4.12 | 4.45 | 3.78 | |
| neck length | 2.86 | 2.18 | 2.52 | 1.92 | |
| torso length | 11.40 | 7.95 | 8.32 | 6.35 | |
| shoulder width | 6.67 | 4.75 | 4.21 | 3.41 | |
| average linear | 9.09 | 6.95 | 5.08 | 4.03 | |
| calf girth | 9.05 | 7.37 | 5.46 | 4.59 | |
| thigh girth | 17.50 | 15.00 | 12.17 | 9.76 | 6 |
| waist girth | 23.83 | 18.30 | 16.16 | 14.4 | |
| chest girth | 23.39 | 19.00 | 15.43 | 14.2 | 15 |
| hip girth | 25.34 | 20.2 | 14.44 | 11.9 | 12 |
| neck girth | 5.96 | 4.63 | 3.56 | 3.04 | |
| head girth | 8.26 | 6.48 | 5.32 | 3.77 | |

TABLE 2-continued

Anthropomorphic measurement errors (women). Mean absolute errors and standard deviations for several body measurements: linear error in mm, weight in kg. A model using only words is already quite accurate. Errors go down when self-reported height and weight are used (here with simulated noise). AE refers to the "allowable error" (see text).

| Measurement | w2s | | whw2s | | AE |
|---|---|---|---|---|---|
| | error | SD | error | SD | |
| arm girth | 9.77 | 7.63 | 5.48 | 4.49 | |
| wrist girth | 4.11 | 3.19 | 2.12 | 1.74 | |
| average girth | 14.14 | 11.133 | 6.30 | 7.54 | |

Table 2 shows the prediction error for each measurement. Surprisingly, words alone constrain measurements well. For example, the raters have no absolute cues about height, yet estimate it with an average error of 2.6 cm. This is equivalent to one standard deviation of self-reported error in height. When noisy height and weight are added, the errors decrease significantly.

Figure 7:
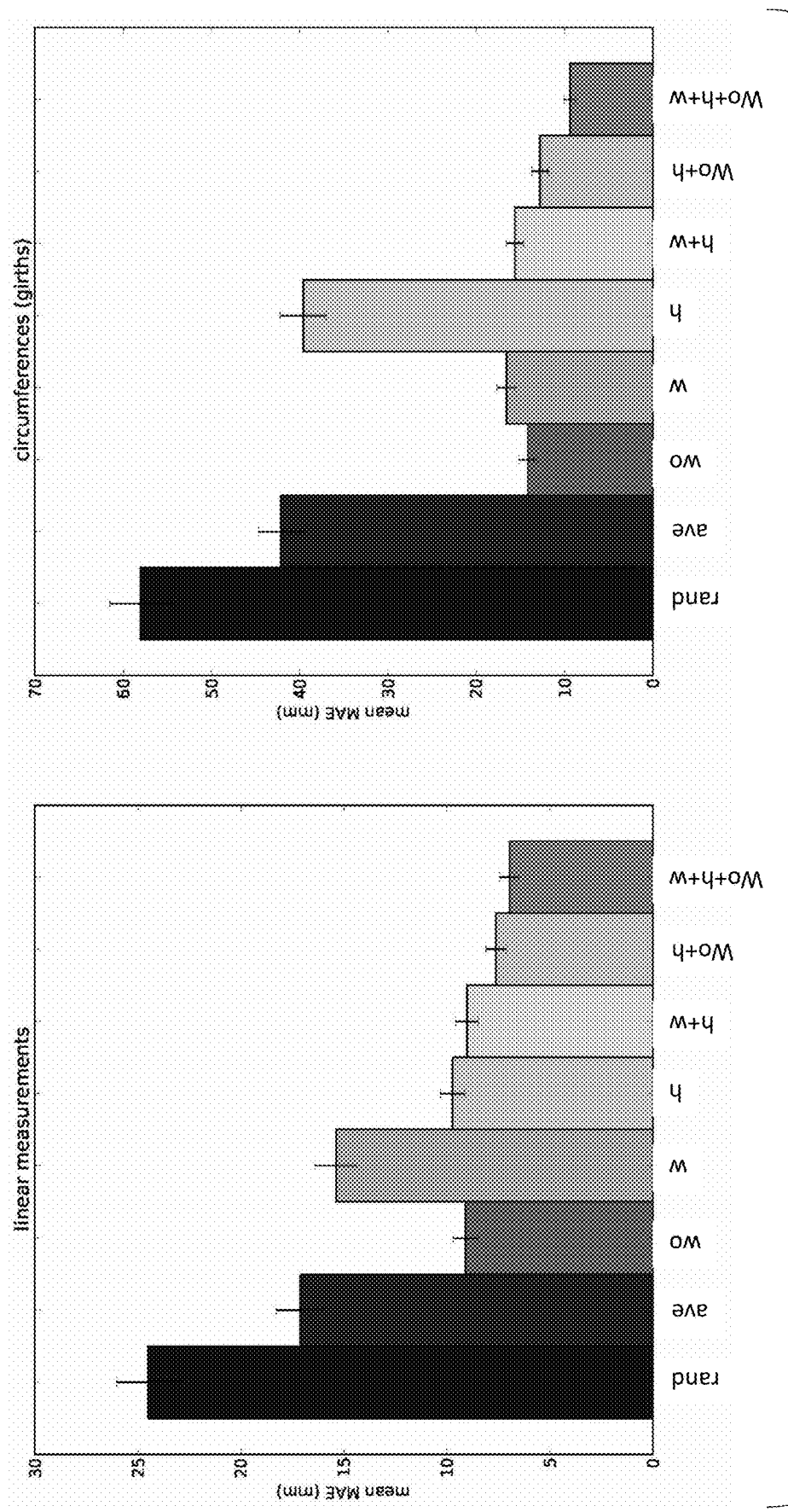
FIG. 7: summarizes the measurement errors for linear measurements and circumferences (girths).

FIG. 7 summarizes the results of the anthropometric analysis of different models. The two bar plots show the average measurement errors using the same models in FIG. 4.

Table 2 also lists the allowable error (AE) as specified by the US Army [Gordon et al. 1989]. AE is derived from the repeatability of expert human measurements of the body. Many sizing methods that use high-resolution scans still have trouble with achieving errors below the AE. While computed lengths and girths do not correspond directly to those in the Army study, these are provided in the table as a rough rule of thumb as to what would be a good error value for these measurements. Measurements were selected from that study that are most similar to the present measurements by the inventors. The average error on the subset of measurements is below 10 mm.

Without the use of a scanner, and with noisy height and weight, whw2s estimates body shapes with errors close to the AE (and below in 2 of the 7 cases). If noiseless height and weight is known, then all errors drop below the AE with the exception of thigh girth.

In creating avatars, metric accuracy is not the only criterion for success. In fact, it is easy to construct bodies that have low metric error but do not look like the subject of interest, and vice versa. According to the present embodiment of the invention, a perceptual evaluation tests the ability of the word-to-shape model, to produce perceptually believable 3D digital bodies. Here, it is tested whether human subjects can tell the difference between bodies constructed from ratings of photos and those constructed from a high resolution 3D scan.

Two different methods are used for generating personalized digital bodies and compare the results in a similarity rating experiment. For Method 1 6 human subjects were scanned with different body shapes using a high-resolution 3D scanner. Subjects gave informed, written, consent. A SMPL model was aligned to each of the scans by optimizing the pose and shape parameters to fit the scan data. For consistency with the w2s method, only the first 8 principal shape directions were optimized. The images of the bodies were rendered as in the training data.

Figure 8:
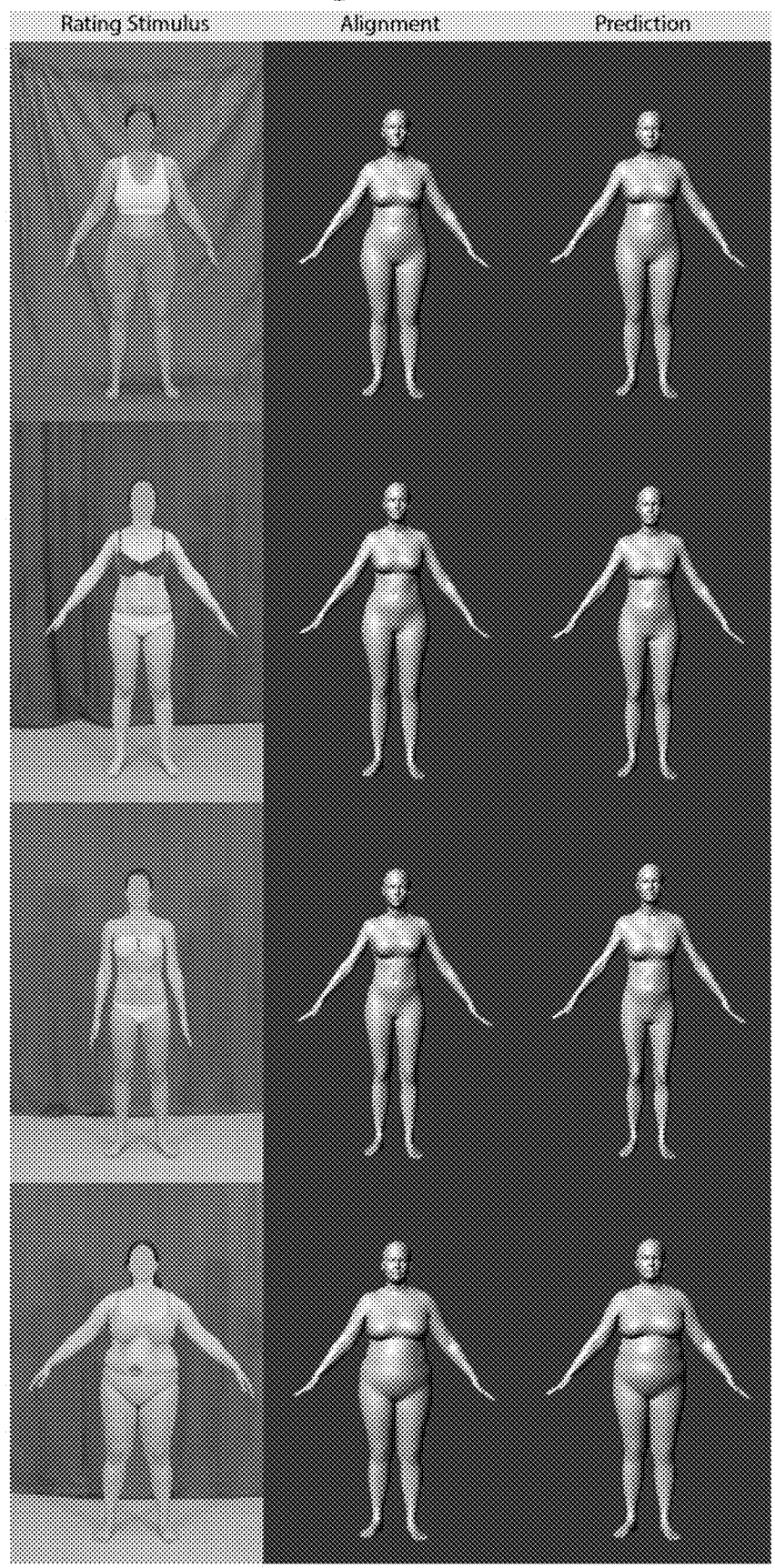
FIG. 8: Perceptual Evaluation. Example stimuli. (left) Photographs. (middle) Images of 3D meshes generated by aligning a SMPL model to high resolution 3D body scans of the people in the photos (reposed to our standard pose). (right) Images of 3D body meshes predicted from the word ratings of the photographs using w2s. Mechanical Turk users rated the similarity between the photographs and the corresponding rendered meshes as well an average body.

Also, a color digital photograph was taken of each of the subjects. In Method 2 30 MTurk users rated the photographs using the 30 words. The w2s model was used to estimate the body shape parameters from the ratings and generated the 3D body meshes. These were rendered as in Method 1. FIG. 8 shows the data: the photograph and the two rendered bodies.

In a perceptual similarity study, 30 MTurk users rated the similarity between the photographs and 1) an average shape, 2) bodies from scans (Method 1), and 3) bodies from words (Method 2). Similarity was assessed using a 7-point Likert scale ranging from (1) not similar at all to (7) extremely similar. Raters rated a total of 18 similarity comparisons (6 models times 3 comparisons).

For each condition, the mean similarity score (MSS) is computed. The results are summarized in Table 3.

| Method | MSS | SD |
|---|---|---|
| Method 1 (scan fit) | 5.265 | 1.403 |
| Method 2 (w2s) | 5.537 | 1.295 |
| Average | 3.659 | 1.761 |

Remarkably the w2s body is judged as slightly more similar to the image than a body fit directly to the 3D scan of the person, though the difference is not significant (paired t-test, t=1.297, p=0.251). Both methods for creating bodies however, produce bodies significantly more similar to the photograph than the average body. This suggests that the visual shape ratings capture perceptually salient information about body shape. This is important, for example in understanding clothing shopping, where stylistic elements of clothing may be related to the perceived shape of the body in addition to measurements.

Figure 9:
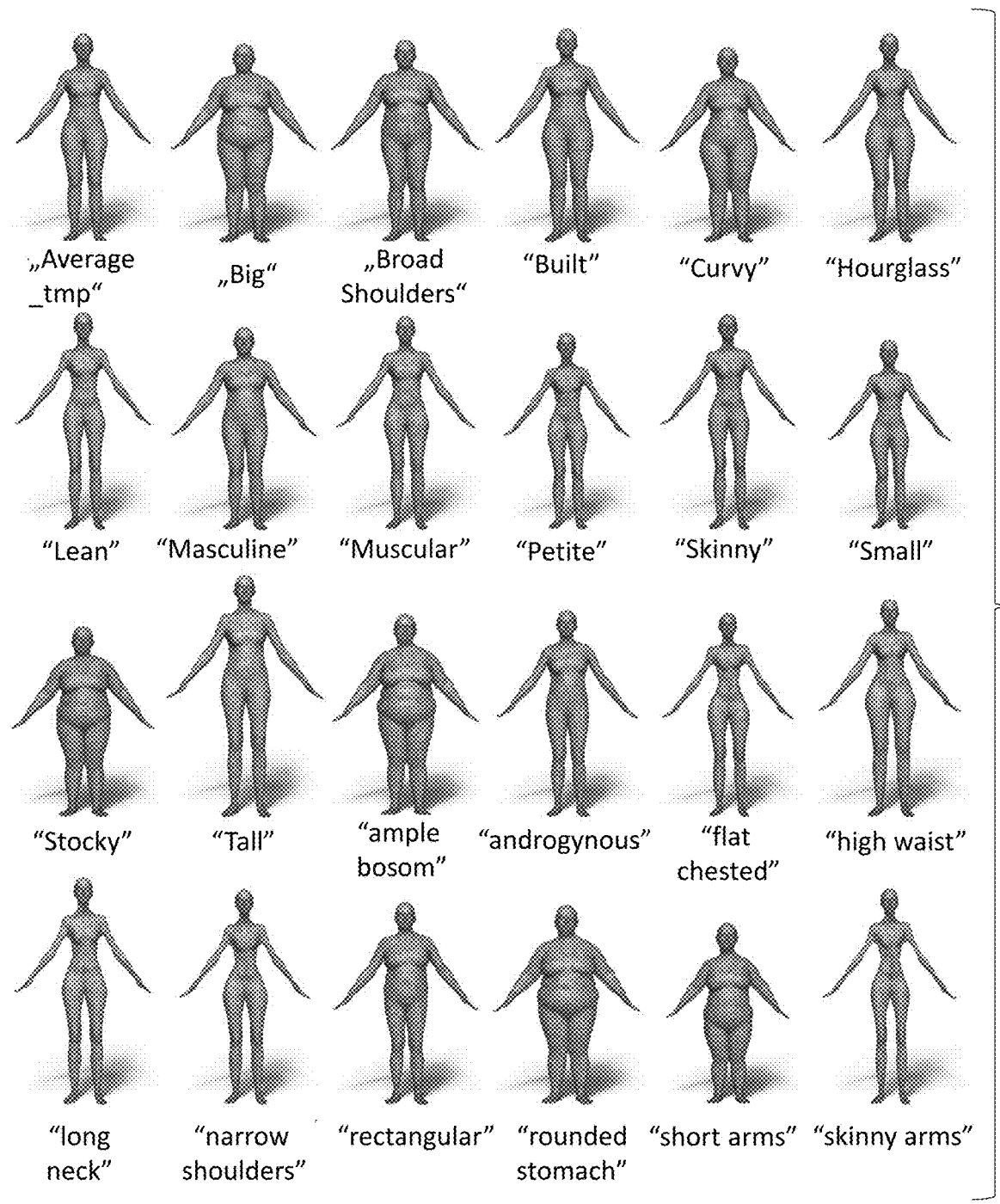
FIG. 9: illustrates visualizing words as shapes. Prototype bodies created by conditioning on individual word ratings, estimating the remaining ratings based using the learned word correlation, and generating the body shape. These prototype bodies reveal the meaning that the crowd associated with each word. For visualization purpose they are slightly exaggerated beyond "normal" human bodies.

FIG. 9 illustrates visualizing words as shapes according to an embodiment of the invention. Prototype bodies created by conditioning on individual word ratings, estimating the remaining ratings based using the learned word correlation, and generating the body shape. These prototype bodies reveal the meaning that the crowd associated with each word. For visualization purposes, they are slightly exaggerated beyond "normal" human bodies.

More particularly, the inventive model allows visualizing the meaning of the word "pear-shaped" or "hourglass" in terms of a 3D body shape. Using the Gaussian model of ratings, one conditions on a particular value of a rating as described above. For example, "pear shaped" can be set to an exaggerated value and the most likely value of the other ratings can be computed. One then predicts the body shape coefficients using this artificial rating vector and generate the 3D shape. FIG. 1 shows a few such bodes and FIG. 9 shows a few more; they are exaggerated for visualization. What is interesting is that the shapes are immediately recognizable as prototypical examples of the word.

Figure 10:
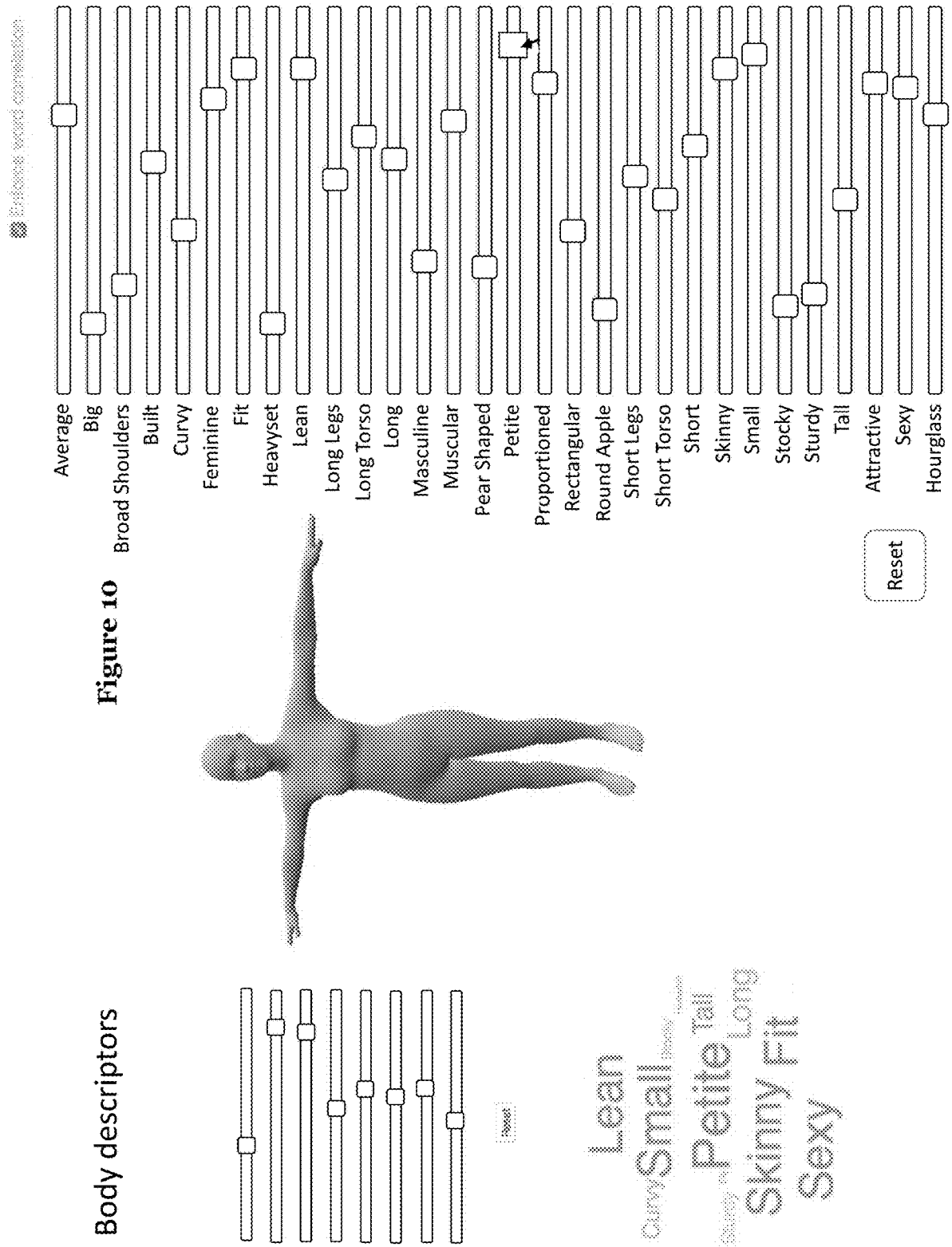
FIG. 10: shows a web interface. Screenshot showing the creation of a body (center) with attribute sliders (right) and principal component sliders (upper left). As the body shape changes so does the word cloud describing the body shape (lower left).

FIG. 10 shows a. web interface of a method according to a further embodiment of the invention. The screenshot shows the creation of a body (center) with attribute sliders (right) and principal component sliders (upper left). As the body shape changes so does the word cloud describing the body shape (lower left).

More particularly, a web interface may be provided to allow people to create bodies using the attributes. Users can move attribute sliders to manipulate the body shape in real time. One can use the sliders in a correlated way or can decouple them to manipulate particular attributes. The user can switch between editing with principal components or with attributes. When editing with PC's the user sees the linguistic description of the body as a "word cloud". This gives users insight into how body shape and language are related. Users can also download meshes, or SMPL models, which can be animated.

FIG. 11 shows visualizations of different somatotypes according to a further embodiment of the invention. More particularly, bodies may be described in many ways. A classical breakdown comprises three body types: mesomorph, ectomorph and endomorph. To do so, one may take standard words associated with these shapes and collect ratings of 256 male and female training bodies using these. Only words and phrases associated with shape (Table 4); were used no words associated with personality traits.

| Endomorph | | |
|---|---|---|
| Soft body | Underdeveloped muscles | Round shaped |
| Mesomorph | | |
| Hard | Muscular body | Mature appearance |
| Ectomorph | | |
| Thing | Flat chest | Delicate build |
| Young | Lighly muscled | Stoop-shouldered |
| Tall | | |
| Miss Wonderly | | |
| Tall | Pliantly slender | High-breasted |
| Angular | Narrow hands | Narrow feet |
| Slender | Long legs | |
| Miles Archer | | |
| Solidly built | Medium height | Wide shoulders |
| Thick neck | Jovial face | Heavy jawed |

Since the ratings are on the same bodies as before, one can simply expand the rating vectors to include the old and new words. To construct the body shapes, the words associated with each type are taken, set to fixed values, conditioned on these and the remaining ratings are estimated. FIG. 11 shows the reconstructed bodies. This is the first time that a realistic version of these body shapes has been created from a statistical model of body shape.

This process is easy to repeat for other shapes in other communities like fashion as long as there is a set of words to describe the shape.

FIG. 12 shows a method for crowdshaping a body using photos from the Internet according to a further embodiment of the invention.

A photo of any person (e.g. a celebrity) can be used to estimate a plausible 3D avatar. FIG. 12 shows a few photos of famous people, submitted to MTurk for 15 ratings each using our original set of 30 words, and the reconstructed body shape. The body was manually posed to be similar to the photo. The resemblance to the actual person is qualitatively reasonable despite the presence of clothing. Results may be made more accurate using height and weight information readily available on the Internet.

Figure 13:
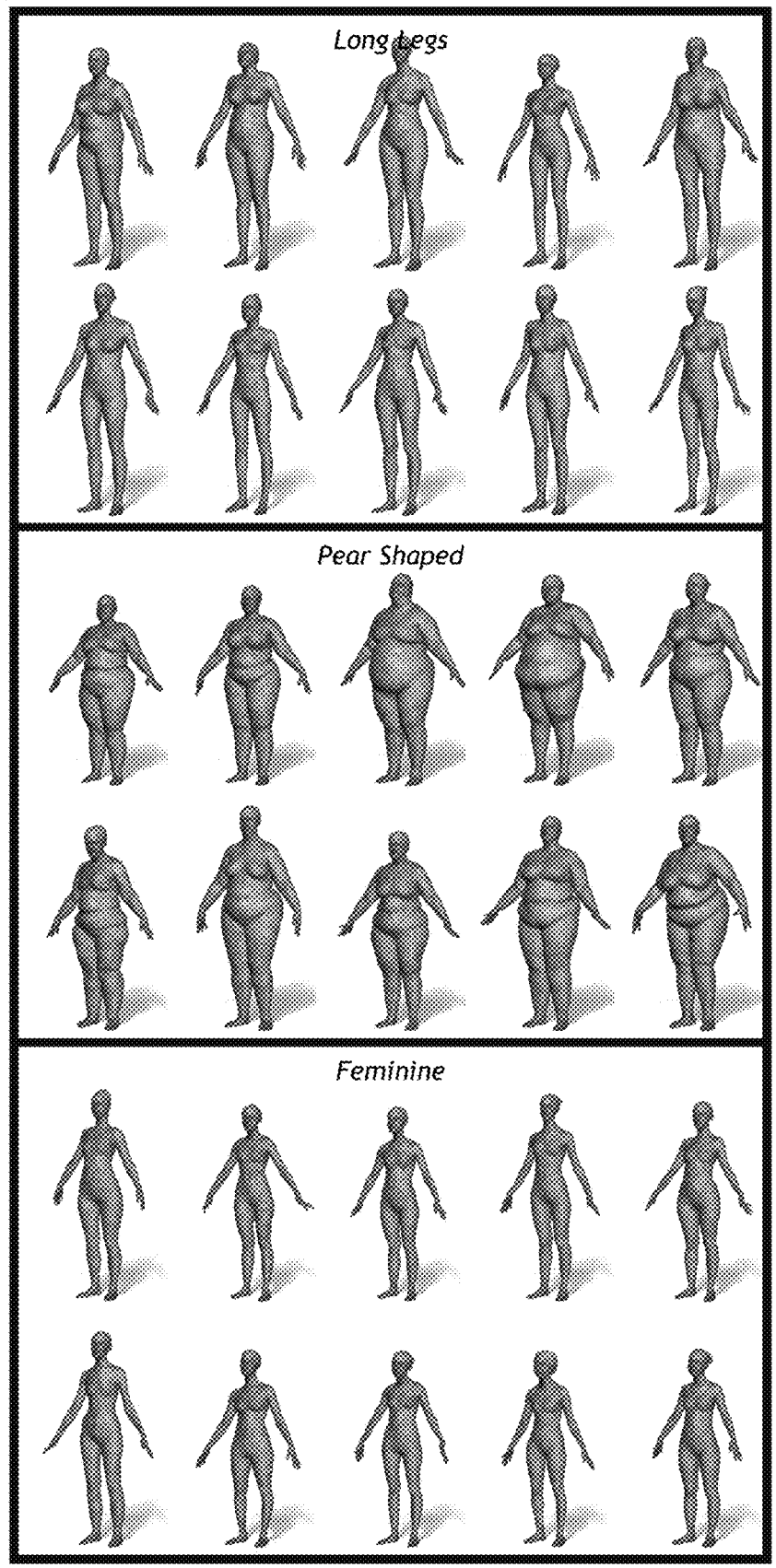
FIG. 13: shows database search with shape attributes. Queries over the CAESAR dataset using "Long legs," "Pear shaped," and "Feminine." Displayed are the top semantic matches. Meshes correspond to the SMPL template mesh aligned to high-resolution CAESAR scans.

FIG. 13 shows a method for a database search with shape attributes according to another embodiment of the invention, enabling queries over the CAESAR dataset using shape attributes like "Long legs," "Pear shaped," and "Feminine." Displayed are the top semantic matches. Meshes correspond to the SMPL template mesh aligned to high-resolution CAESAR scans.

More particularly, given a database of body shapes, the inventive method is capable of indexing it with body descriptors and therefore, allowing descriptive queries over the bodies. The bodies in the CAESAR database are aligned using the SMPL model and, for each body, shape attributes are generated corresponding to the words. Unlike all the other experiments, this is not done through ratings. Rather the shape-to-word (s2w) model is used to predict word ratings given body shape parameters. These words are then stored and their rating values in the database with each body.

Now it is possible to query the database in the usual ways. FIG. 13 presents sample queries over the CAESAR database. Searches for a particular shape attribute return meshes of real bodies that all share this property but exhibit significant variation in other dimensions. The bodies associated with the search for "long legs" all have a similar slender body shape. This semantic search is quite different from searching on "inseam," which would have returned bodies with wide range of body mass indexes (BMI). Instead, the concept that the raters had of long legs. The "pear shaped" search returns bodies of varying height and BMI that all have becomes apparent significant lower body fat as compared to their upper body. Finally, the search for "Feminine" is maybe the most interesting. This is not a search that could be performed with standard measurements. It also reveals what a given population of raters users think is the feminine ideal; the women vary significantly in height and apparent ethnic background but are have a slight build, small breasts, are slim, and are relatively fit. They are almost adolescent in appearance. This suggests that Body Talk, together with the CAESAR dataset, provides and interesting and powerful tool for exploring and understanding cultural ideals and attitudes towards body shape.

According to a further embodiment, database search can further be used, given query body shape, to find similar bodies. One can search using Euclidean distance (simply distance in shape space) but this can produce unintuitive results. Instead, one may first run s2w to generate a vector of word ratings and then search the database for bodies with similar ratings. Searching based on linguistic descriptions (or a combination of linguistic and metric information) produces intuitively meaningful results.

Figure 14:
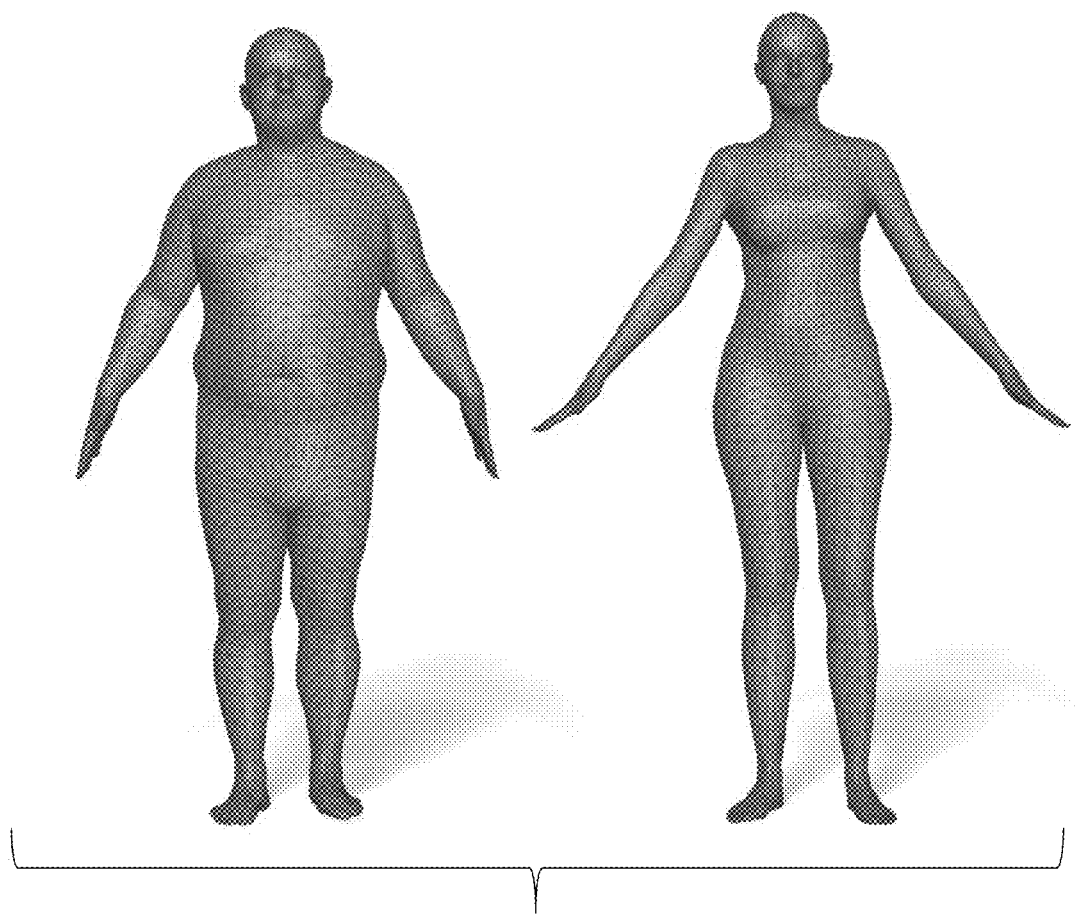
FIG. 14: illustrates the creation of bodies from books. Using a character description in a book, a 3D avatar is created that matches their description. Here "Miles Archer" (left) and "Miss Wonderly" (right) are created from the Maltese Falcon.
Figure 16A:
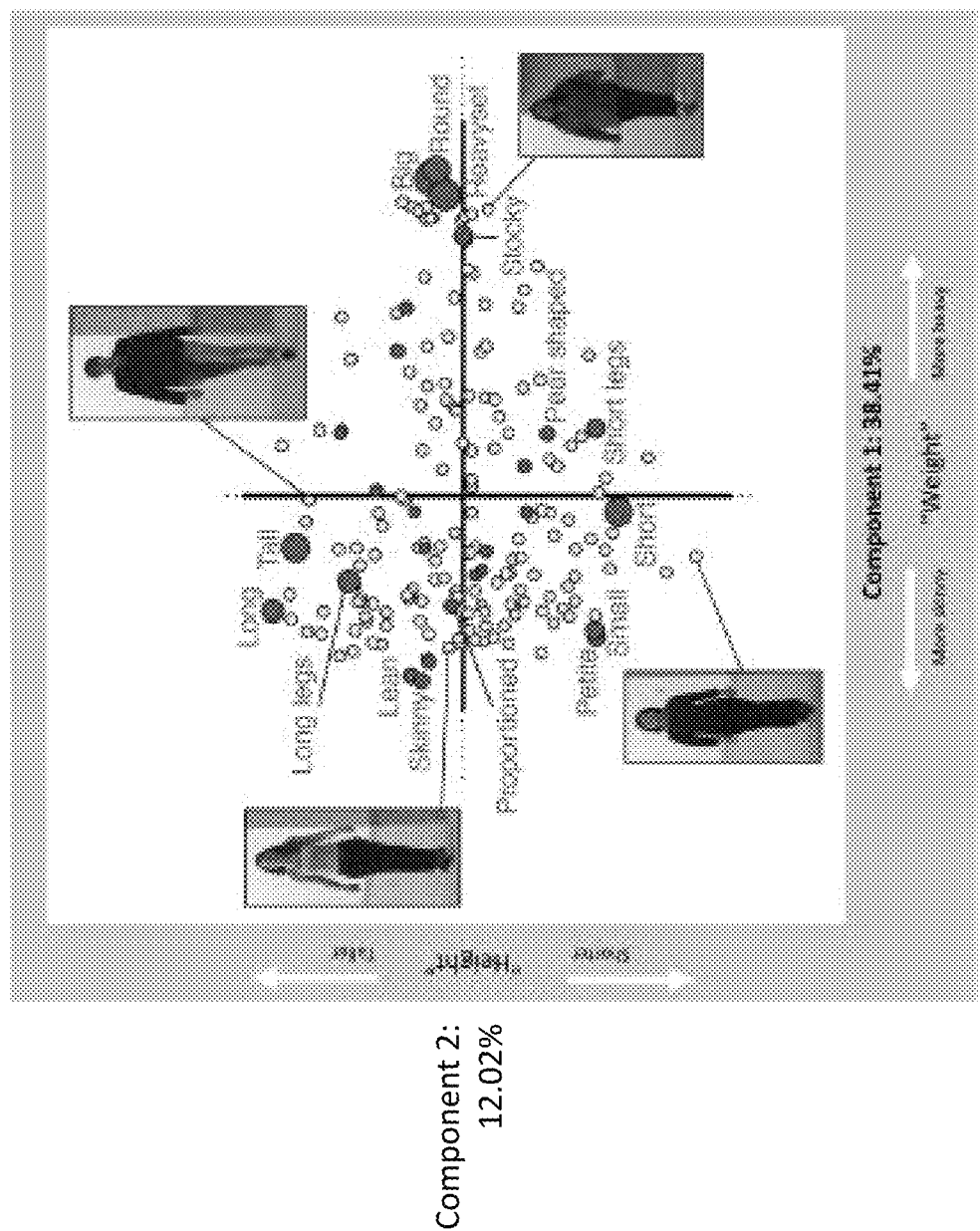
FIGS. 16A-16D: show bi-plots of the first four axes of the language space illustrate the relationship between bodies (gray) and descriptor words (blue)
Figure 16B:
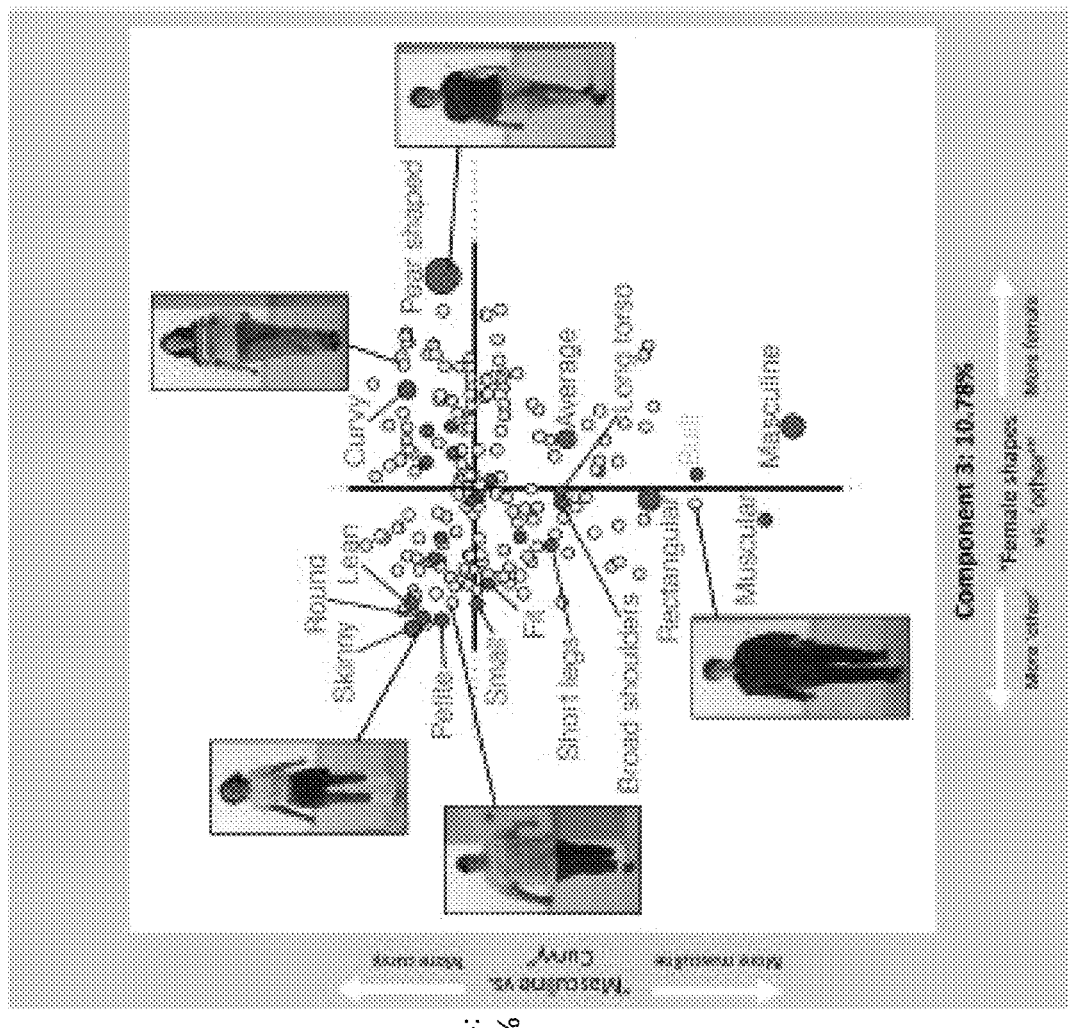
Figure 16C:
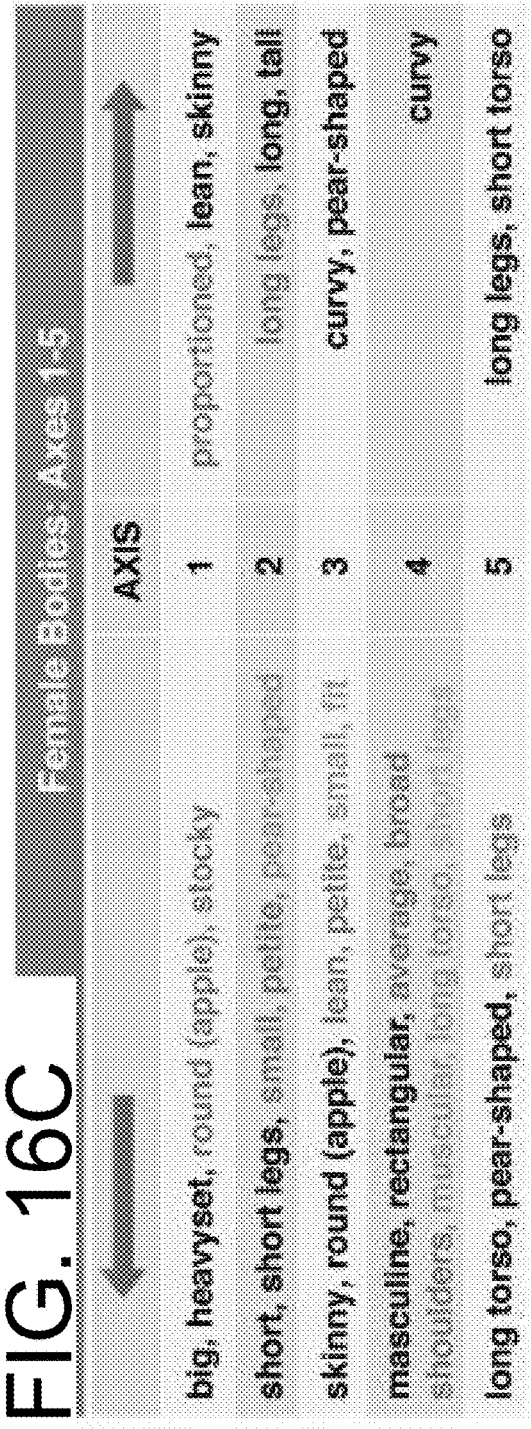
Figure 16D:
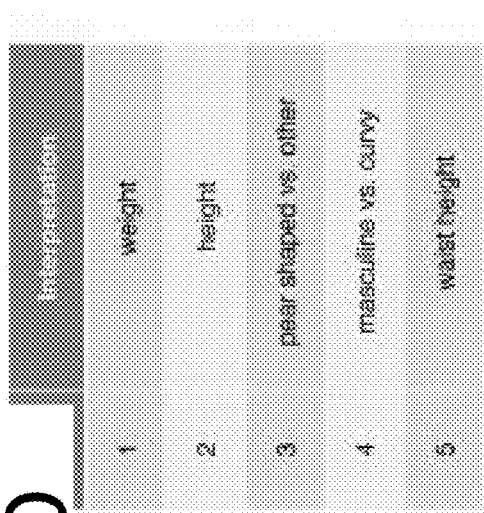

FIG. 14 illustrates the creation of bodies from books. Using a character description in a book, a 3D avatar is created that matches their description. Here "Miles Archer" (left) and "Miss Wonderly" (right) are created from the Maltese Falcon.

More particularly, the training set may be submitted for rating with words from a quote from the Maltese Falcon, describing Miles Archer (Table 4):

She was tall and pliantly slender, without angularity anywhere. Her body was erect and high-breasted, her legs long, her hands and feet narrow.

Some of the words describe face shape and this works with no changes. The words were added to the ratings and bodies may be reconstructed as described in relation to the somatotypes; the body shapes are shown in FIG. 14. This process is quite easy and the bodies both resemble the descriptions. This presents an interesting application for film casting. Given a database of actor shapes (e.g. from celebrity photos), and a book or script, one could match the shapes extracted from the text to the actors who could physically match the part.

These results demonstrate the invention's ability to predict anthropometric measurements from words. Since it was found that words contain metric information, one can skip the step of creating a body and then measuring the body. Instead, one may learn a direct mapping (possibly nonlinear) from ratings to measurements, without first reconstructing a 3D body shape.

On-line dating sites typically ask some basic questions about a user's shape. In a further embodiment of the invention, the model may be used to recover a richer shape representation of users based on community ratings, allowing users to search for partners with particular characteristics. Alternatively, one could search for partners whose shape properties are similar to someone else's. If all users have ratings, then one may reconstruct, from a user's dating history, their ideal body shape preference.

According to a further embodiment of the invention, the ratings support a community-based solution to the problem of clothing sizing, based on matching "attributes" related to body shape between individuals, utilizing a correlation between body shape and clothing size. The idea is that if one has a similar body to other people, then one is likely to be able to wear the same clothes. According to the present invention, the attributes may be obtained without a body scanner. Users may post their pictures on a social media website and their contacts describe their bodies using the inventive system. Alternatively, one could post their photo to a site and before they get their body shape, they have to rate someone else's photo. This creates an incentive to rate photos. If participants also provide a little information about what clothing fits them, one may collect this information from people who have a similar shape. Attribute matching then provides the foundation for a shape-mediated community solution to clothing sizing.

The methods according to the invention can also be applied to other shapes, like animals or cars. All that is required is that the meshes for the objects be in correspondence.

It is known that there are significant correlations between face and body shape but these are not well quantified. Bodies (and faces) may be special, but the existence of words to describe shape more generally suggests otherwise. According to the invention, a few words for faces are used. It was also found that body shape and face shape are related. In a further embodiment of the invention, these correlations can be used in a "police sketch" application. To date such systems use descriptions of the face, ignoring the body. Witnesses may also be able to describe aspects of the suspect's shape. This can be used to create a full body model of the suspect and the body shape can help better determine the face shape.

Bodies can be rated using any words—they do not have to be about shape specifically. For example, one may rate bodies as "democrat" or "republican", "lazy" or "intelligent." This provides a tool to understand the built in biases people have about bodies and how they relate to behavior.

In a further embodiment of the invention, a relationship between the physical dimensions of body shape and the words commonly used to describe bodies was explored. This question was approached by constructing a multidimensional similarity space representation of bodies using people's word based descriptions of full-body photographs of clothed women. The proximity of two bodies in this language space represents the similarity of the descriptions applied to them. To link the language space to the physical variability of human body shapes, verbal descriptions of three-dimensional graphics models of bodies were collected and projected these descriptions into the language space, thereby providing physical shape anchors to connect the linguistic descriptions to the three-dimensional shapes.

This approach was facilitated by an unexpected observation: the first fives axes of the language space seemed to capture body description "features" that could be used to label the axes of variability from a geometric shape space derived from three-dimensional laser scans of 2094 bodies (cf., Anguelov, D., Srinivasan, P., Koller, D., Thrun, S., & Rodgers, J. (2005). Scape: Shape completion and animation of people. ACM Transactions on Graphics, 408-416. http://doi.org/10.1145/1073204.1073207). The order of the axes in the two spaces differed, but the potentially analogous structure of these multidimensional spaces offered a direct route for testing the relationship between body shapes and descriptions. Specifically, if the axes from the language and shape spaces coarsely correspond, it should be possible to create a three-dimensional physical body shape of an individual from the verbal description of a photograph of the person. In the context of the similarity space, a person's description takes the form of a point in the multidimensional language space. This point is specified by its coordinates in the space, which indicate where the person's description stands relative to the descriptions of other people on each axis in the space. Thus, it was possible to select individual points from the language space (i.e., based on descriptions made to photographs), and after transposing axes to account for rank order differences between the two spaces, place the points into the body shape space. One can then create three-dimensional graphics models of bodies at these locations in the shape space. It was hypothesized that if sparse language captures the complex physical variability of bodies, the three-dimensional bodies in the shape space should correspond to—or approximately match—the human-generated descriptions from which they were made.

Participants were recruited from the subject pool at The University of Texas at Dallas (UTD) through an online sign-up. Twelve people (all female) participated in a pilot study to validate the description term list. Sixty volunteers (30 female) rated the body photographs and 60 volunteers (30 female) rated the 3D body reconstructions. There were no overlapping participants in the three groups. Because the study did not employ a traditional experimental design with manipulated variables, the goal was to include enough participants to achieve stable ratings of the bodies for the multivariate analysis. First, testing with a number of raters typical for face rating studies took place. Next, it was assured the stability of the multivariate analysis by re-computing axes after eliminating data from 15 participants (5 per data block). All interpreted axes remained stable with this deletion, indicating a sufficient number of participants.

Full body photographs of 164 women were selected from videos in the Human ID Database (O'Toole, A. J., Harms, J., Snow, S. L., Hurst, D. R., Pappas, M. R., Ayyad, J. H., & Abdi, H. (2005). A video database of moving faces and people. IEEE Transactions on Pattern Analysis and Machine Intelligence, 27(5), 812-816. http://doi.org/10.1109/TPAMI.2005.90). The videos show people walking toward a camera. Two frames were selected from each video: a standing image and a mid-stride image. Standing images were captured from the first frame of the video (approximately 13.6 meters away from the camera) or from the earliest frame showing the person at rest with hands at her sides. Mid-stride images were captured from the last full-stride frame in which the full body, including the feet, is visible.

The image frames were cropped to remove excess background and resized to a uniform height of 900 pixels with each image's original aspect ratio preserved. The Adobe Photoshop CS5 (Version 12.0) Sponge filter was applied to the whole image to obscure facial detail. This filter also preserves and sharpens the body contour. FIG. 15A shows an example of the processed body photographs.

Descriptors were sourced first from online dating profiles and clothing store fit recommendations. Next, a pilot study was conducted to refine this initial list. Participants in this pilot study freely described the bodies in the images by typing a short description of each person's body type in a small text box. They were told to ignore the face, clothing, hair, and race. Based on the terms generated from these free form descriptions, the initial list was augmented by including words that appeared commonly in these descriptions, but were not in the initial list. The final list of terms captured global shape features, such as round and rectangular; local features, such as long legs and short torso; gender-related terms such as curvy and masculine; and health-related terms such as muscular and fit. Table 1 contains the list of the 27 body descriptor terms used.

TABLE 1

List of Body Descriptor Terms

| proportioned | short legs | pear shaped |
| rectangular | long legs | long |
| stocky | long torso | curvy |
| big | short torso | masculine |
| muscular | small | tall |
| average | lean | sturdy |
| skinny | round (apple) | built |
| fit | petite | heavyset |
| short | broad shoulders | feminine |

On each trial, participants simultaneously viewed a person's standing and mid-stride image, along with the list of 27 descriptor terms in between the images (see FIGS. 15A-15B. For each body, participants responded to each term by clicking one of three radio buttons indicating that the descriptor: does not apply, applies somewhat, or applies perfectly to the body. Trials were self-paced. Data ratings were carried out on 165 females and 60 males. Due to the length of the task, each participant rated a counterbalanced subset of 75 of the total 225 people. Across all participants, a full set of ratings was obtained from 20 participants for each body.

The language space was constructed using correspondence analysis (CA) a multivariate analysis method for categorical data, similar in form to principal component analysis (PCA). CA was applied to 164 of the 165 female body photograph ratings, using ratings that "applied perfectly" to the bodies. One female, who was perceived consistently as a male, was omitted from the analysis. Specifically, the input to the CA was an I×J matrix, X, of counts, tallied across raters, where I was the number of bodies and J was the number of descriptors. $X_{ij}$ contained the number of participants who rated the $j_{th}$ descriptor as applying perfectly to $i^{th}$ body. The categorical nature of the data, expressed in a $\chi$ contingency table, supports a bi-plot visualization of the rows (descriptors) and columns (bodies) in the same space. Individual axes were interpreted using the contribution scores of the descriptor terms. These indicate the importance of a term for establishing a component and are defined formally as the ratio of the squared factor score to the axis eigenvalue. Contributing descriptors were selected using a rule of thumb, which assigns importance to contribution scores greater than 1/n, where n, in the present case, is the number of descriptors.

As applied here, the CA produced a multidimensional representation that enabled visualization of the bodies and descriptor terms in a common space. The distance between bodies in this space is a measure of the similarity of the linguistic descriptions applied to them. Because the terms and bodies coexist in the same space, each axis was interpreted by finding the descriptor terms with the highest axis contribution scores. Interpretations were made by comparing terms with large contribution scores that projected to opposite (i.e., positive and negative) sides of an axis.

FIG. 16 illustrates the first four axes of the space and a qualitative interpretation of each.

The first two axes roughly correspond to weight and height. The next two axes are related to different aspects of feminine appearance: (Axis 3: pear-shaped women vs. women with "other" shapes; Axis 4: masculine women vs. curvy women). The fifth axis, not shown in the figure, was interpretable as waist-height or torso-to-leg length ratio.

The geometric shape space was an extended version of the SCAPE model of body pose and shape variation applied to data from laser scans of people (Anguelov, D., Srinivasan, P., Koller, D., Thrun, S., & Rodgers, J. (2005). Scape: Shape completion and animation of people. *ACM Transactions on Graphics*, 408-416. http://doi.org/10.1145/1073204.1073207). In the SCAPE model, body shape is represented in terms of 3×3 deformation matrices consisting of transformations of triangles in a template mesh into triangles in an instance mesh (cf. (Anguelov, D., Srinivasan, P., Koller, D., Thrun, S., & Rodgers, J. (2005). Scape: Shape completion and animation of people. *ACM Transactions on Graphics*, 408-416. http://doi.org/10.1145/1073204.1073207, for full details). A template mesh with 86,200 triangles was aligned (registered) to 2094 laser scans of women from the Civilian American and European Anthropometry Resource Project (CAESAR) dataset (cf. Piryankova, I. V, Stefanucci, J. K., Romero, J., Rosa, S. D. E. L. A., Black, M. J., & Mohler, B. J. (2014). Can I recognize my body's weight? The influence of shape and texture on the perception of self, 11(3), 1-18). CAESAR contains full-body laser scans of American and European volunteers between the ages of 18-65, wearing bicycle-style shorts and a sports bra (for women). The alignment process (Hirshberg, D. A., Loper, M., Rachlin, E., & Black, M. J. (2012). Coregistration: Simultaneous alignment and modeling of articulated 3D shape. *Lecture Notes in Computer Science (including Subseries Lecture Notes in Artificial Intelligence and Lecture Notes in Bioinformatics)*, 7577 LNCS (PART 6), 242-255. http://doi.org/10.1007/978-3-642-33783-3_18) puts all the shapes into correspondence, enabling statistical analysis. Further, the SCAPE representation factors pose and body shape, allowing analysis of only body shape.

A low-dimensional shape space was created by applying principal component analysis (PCA) to the "shapes" of these bodies, defined as the triangle deformations of the 2094 aligned template bodies. This gave a 3D-morphable representation of bodies that allowed for smooth transitions of body shape across arbitrary multivariate trajectories in the space.

Figure 17C:
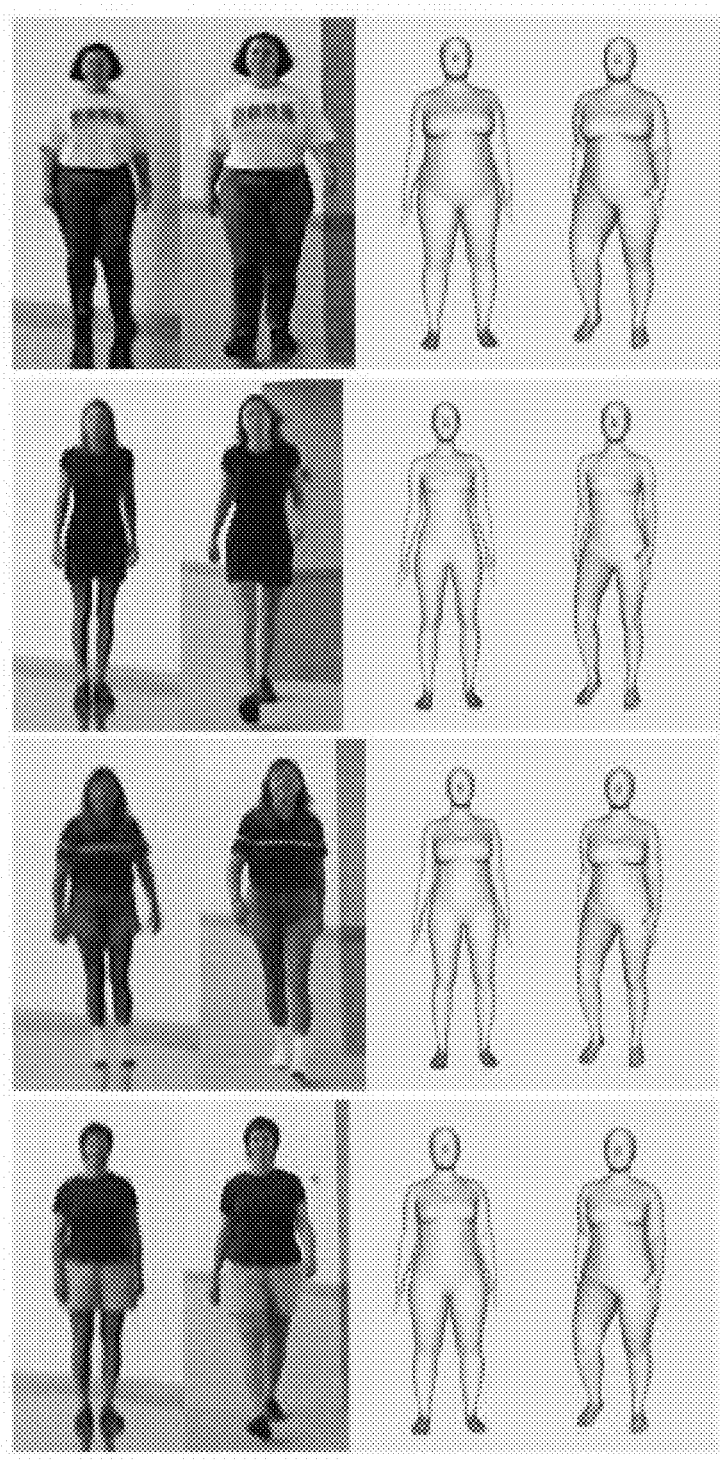

Although the principal component axes (PCs) are purely geometric, they have approximate linguistic interpretations (FIG. 17A). Interpretation of the axes of the shape space was made by visual inspection of bodies produced by adding (subtracting) three standard deviations to (from) each PC (FIG. 3A). The shape space axes were tentatively interpreted as representing: 1.) weight, 2.) masculine vs. curvy, 3.) height, 4.) waist height, and 5.) pear-shaped vs. other. These labels were chosen from the labels applied to the first five axes of the language space, but with the rank order of the axes shifted between the two spaces. Specifically, parity between the following axes was hypothesized: a.) the first axis in both the language and shape space (weight); b.) Axis 2 in the language space and Axis 3 in the shape space (height); c.) Axis 3 in the language space and Axis 5 in the shape space (pear-shaped vs. other); d.) Axis 4 in the language space and Axis 2 in the shape space (masculine vs. curvy); and e.) Axis 5 in the language space and Axis 4 in the shape space (waist-height).

Given the potentially analogous interpretation of the first five axes of the language and shape spaces, the two spaces were aligned by re-ordering the axes in the shape space to match the analogously interpreted axes in the language space. Next, the shapes of the 164 photographed individuals were approximated by synthesizing their bodies in the shape space at positions specified by their locations (coordinates) in the language space. FIG. 17B shows a schematic of this process. Beginning with the coordinates of each person on the first five (interpreted) dimensions of the language space, a corresponding three-dimensional body was constructed, using the first five dimensions of the shape space, for all of the 164 photographed bodies. For each body, synthesis in the shape space was accomplished by a linear combination of the principal components (PCs), where the weight applied to each PC was the projection coefficient or "coordinate" specified by its position in the language space on the analogous dimension.

More concretely, the PC shape space model allows for a low-dimensional representation of body shape in the subspace U, defined by the first 5 "interpreted" dimensions. An individual shape $S_j$ is represented by a set of 5 linear coefficients, $\beta_j$, that represent a body's coordinates with respect to the PCs. Thus, a body at a position in this 5-dimensional space is approximated as $S_j = U_j \beta_j + u$, where u is the average body. To create body models of the 164 photographs using their coordinates in the language space, their factor scores were standardized on the first five axes. Next, the coordinates of the photographed bodies were reordered in the language space to match the analogously interpreted axes in the shape space. These new standardized coordinates were used to synthesize bodies at these positions in the shape space. Thus, the modeled body was created as a weighted sum of the first five PCs, with the coordinate vectors serving as the weights. This produced 164 synthetic geometric body models, which were rendered in two poses (standing and mid-stride) to match the photographic bodies. FIG. 3C shows example photographs and their corresponding synthesized three-dimensional bodies. A casual visual inspection reveals that these appear quite similar to each other.

To formally test the resemblance between the 2D photographs and their 3D synthesized body approximations, a new set of participants rated the synthesized bodies using a procedure identical to that used for the body photographs, but with the rendered models replacing the photographs (see FIG. 15B). As for the photograph ratings, for the analysis, these data were represented as a 27-element description vector that contained the frequency with which these descriptors were judged by participants to apply perfectly to the body.

To test the perceptual similarity between the photographed bodies and the 3D rendered bodies, the description vectors for the 3D body models were projected as supplementary points onto axes of the language space. If the models resemble the photographs, one would expect the description vector projections (points) to be close in the multivariate language space to the descriptions (points) of the photographed bodies used to create them. For brevity, the term true-match pair is used to refer to a pair of points in the language space comprised of a 3D body's description point and the description point of the photograph body from whose coefficients it was generated. Non-matched pairs refer to a 3D body's description point and the description point of an unrelated photograph body. FIGS. 18A-18C show a schematic of the method used for determining the similarity of descriptions for the photographed and three-dimensional body models.

A bootstrap hypothesis test was used to determine if the descriptions of true-match pairs were closer in the language space than descriptions of randomly sampled non-matched pairs. For 1,000 iterations, random samples of 164 non-matched pairs were selected and computed the mean Euclidian distance between pair descriptions in the 5-dimensional language space. This yielded a distribution of non-matched sample means that is compared to the average true-match distance. For inferential purposes, a two-tailed cutoff value of $p<0.05$ was selected.

There was no overlap between the mean of the true-match pairs (M=0.563) and the distribution of 1000 non-matched sample means (M=1.145, SD=0.034). This indicates that the descriptions of the true matches were more similar to each other than were descriptions of random non-matched pairs. Therefore, the language-based descriptions of photographed bodies were sufficient to synthesize three-dimensional reconstructions of body shapes that matched these descriptions. This synthesis was accomplished by linking a language space, derived from a handful of descriptor terms, to a shape space derived from a large and independent sample of human bodies.

Next, it was asked whether the resemblance was based on the pattern of variation captured by the combination of all five language/shape dimensions or by one or two perceptually salient dimensions. To dissect the role of individual axes of variation in resemblance, the distances between the projected and original points were recomputed along single dimensions in the language space, corresponding to 1.) weight, 2.) height, 3.) feminine versus other, 4.) masculine vs. curvy, and 5.) waist height. A bootstrap test of the sample means of the non-matched pairs along the individual axes showed no overlap ($p<0.001$) between the mean of the true-match pairs and the bootstrap histogram for the axes corresponding to weight [Axis 1, true-match, M=0.171; non-matched, M=0.696, SD=0.043], height [Axis 2, true-match, M=0.189; non-matched, M=0.421, SD=0.025], and pear-shaped vs. other shapes [Axis 3, true-match, M=0.219; nonmatched, M=0.375, SD=0.021]. For the waist-height axis, the descriptions of the true-match pairs were significantly more similar than the bootstrapped non-matched pairs, [Axis 5, truematch, M=0.198; non-matched, M=0.233, SD=0.014, p=0.013]. For the masculine vs. curvy axis, the true pairs were marginally more similar than the descriptions made to random pairs [Axis 4, true-match M=0.269; non-matched, M=0.302, SD=0.018, p=0.064]. These results indicate that all five dimensions contribute to the overall resemblance between the photographs and three-dimensional models.

A closer look at the data also suggested that this resemblance was sufficient to support body shape categorization, but not identification-a finding consistent with humans' preferential reliance on faces for identification. Because categorical information supports social and affective judgments that rely on coarse shape (e.g., femininity, athleticism, obesity), particular body descriptions apply accurately to many people. Therefore, the projection of a description of a three-dimensional body reconstruction should be close, not only to the body whose description was used to create it, but also to other categorically similar bodies. Evidence for this categorical role can be seen by looking at the rank of the proximity of the true-match, with respect to all other non-matched pairs. The description of the three-dimensional body was the closest point (i.e., body description) to its matched photograph's description in only 8% of the 164 cases; but was among the 10 closest points in 40% of cases, and among the 30 closest points in 80% of the cases.

Implementation

The methods according to the invention may be implemented on a computer, especially on a graphics card or a smartphone.

Example embodiments may also include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer readable media. Computer-executable instructions include, for example, instructions and data, which cause a general-purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer executable instructions into the executable format and a second computer may execute the transformed instructions.

The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, apps for smartphones, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation.

Such networking environments are commonplace in office-wide or enterprise-wide computer networks, intranets and the Internet. Those skilled in the art will appreciate that such network computing environments will typically encompass many types of computer system configurations, including personal computers, hand-held devices like mobile phones, multiprocessor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An example system for implementing the overall system or portions might include a general-purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer readable media provide nonvolatile storage of computer executable instructions, data structures, program modules and other data for the computer.

Software and web implementations could be accomplished with standard programming techniques with rule-based logic and other logic to accomplish the various database searching steps, correlation steps, comparison steps and decision steps. The words "component" and "section" as used herein and in the claims is intended to encompass implementations using one or more lines of software code, hardware implementations, or equipment for receiving manual inputs.

We claim:

1. Computer-implemented method for generating a body shape, the method comprising:
   receiving one or more linguistic descriptors related to the body shape;
   mapping the one or more linguistic descriptors to coefficients describing the body shape, using a mapping between a linguistic body space and a geometric body space, wherein the linguistic body space is represented in terms of body descriptor words and wherein the geometric body space is represented in terms of coefficient vectors;
   generating the body shape, based on the coefficients; and outputting the generated body shape,
wherein the mapping was learned based on empirical user ratings.

2. The method of claim 1, wherein the user ratings indicate a degree to which a given linguistic descriptor applies to a given body shape.

3. The method of claim 2, wherein the degree is selected from a given Likert scale.

4. The method of claim 3, wherein the mapping is linear.

5. The method of claim 4, wherein the mapping has been learned using principal component analyses (PCA).

6. The method of claim 1, used for visualizing word meaning.

7. The method of claim 1, wherein a slider may be used to set linguistic body descriptors.

8. The method of claim 2, wherein the body shapes are presented as photos of persons.

9. The method of claim 1, wherein the body shape is retrieved from a database.

10. The method of claim 1, wherein a set of similar body shapes is generated.

11. The method of claim 1, wherein the linguistic descriptors include words not related to body shape.

12. A device for generating a body shape, the device comprising:
a receiving unit for receiving one or more linguistic descriptors related to the body shape;
a mapping unit for mapping the one or more linguistic descriptors to coefficients describing a body shape, using a mapping between a linguistic body space and a geometric body space, wherein the linguistic body space is represented in terms of body descriptor words and wherein the geometric body space is represented in terms of coefficient vectors;
a generating unit for generating the body shape, based on the coefficients; and
an output unit for outputting the generated body shape,
wherein the mapping is learned based on empirical user ratings.

13. The device of claim 12, wherein the user ratings indicate a degree to which a given linguistic descriptor applies to a given body shape.

14. The device of claim 13, wherein the degree is selected from a given Likert scale.

15. A computer-implemented method for searching given body shapes in a database, wherein the body shapes are represented in terms of body shape coefficients, the method comprising:
receiving one or more linguistic descriptors related to a body shape;
predicting a vector of word ratings, based on the body shape coefficients of a body, by using an inverted mapping between a linguistic body space and a geometric body space, wherein the linguistic body space is represented in terms of body descriptor words and wherein the geometric body space is represented in terms of coefficient vectors;
matching the one or more linguistic descriptors and the vector of word ratings; and
outputting the body shape, if a match was found.

16. The method according to claim 15, wherein the mapping was learned based on empirical user ratings.

* * * * *